(12) United States Patent
Ramasubramonian et al.

(10) Patent No.: US 9,794,579 B2
(45) Date of Patent: Oct. 17, 2017

(54) DECODED PICTURE BUFFER OPERATIONS FOR VIDEO CODING

(71) Applicant: QUALCOMM Incorporated, San Deigo, CA (US)

(72) Inventors: Adarsh Krishnan Ramasubramonian, San Diego, CA (US); Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 600 days.

(21) Appl. No.: 14/330,836

(22) Filed: Jul. 14, 2014

(65) Prior Publication Data

US 2015/0016545 A1    Jan. 15, 2015

Related U.S. Application Data

(60) Provisional application No. 61/846,576, filed on Jul. 15, 2013.

(51) Int. Cl.
*H04N 19/29* (2014.01)
*H04N 19/30* (2014.01)
*H04N 19/597* (2014.01)
*H04N 19/70* (2014.01)
*H04N 19/423* (2014.01)

(52) U.S. Cl.
CPC ............. *H04N 19/29* (2014.11); *H04N 19/30* (2014.11); *H04N 19/423* (2014.11); *H04N 19/597* (2014.11); *H04N 19/70* (2014.11)

(58) Field of Classification Search
None
See application file for complete search history.

(56) References Cited

PUBLICATIONS

Chen et al. "AHG9: On DPB operations in HEVC 3DV and scalable extensions," 13. JCT-VC Meeting; 104. MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0270, Apr. 9, 2013 (Apr. 9, 2013), XP030114227.*
Wiegand et al., "WD1: Working Draft 1 of High-Efficiency Video Coding," JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.

(Continued)

*Primary Examiner* — Andy Rao
*Assistant Examiner* — Tyler Edwards
(74) *Attorney, Agent, or Firm* — Shumaker & Sieffert, P.A.

(57) ABSTRACT

A method of decoding video data comprising partitioning a decoded picture buffer (DPB) into a plurality of sub-DPBs, receiving at least one indication of a sub-DPB size for the plurality of sub-DPBs for one or more operation points of a multi-layer video coding process, and allocating memory space for the plurality of sub-DPBs based on the at least one indication.

36 Claims, 9 Drawing Sheets

(56) References Cited

PUBLICATIONS

Bross et al., "WD5: Working Draft 5 of High-Efficiency Video Coding," 7th Meeting: Geneva, CH, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High Efficiency Video Coding (HEVC) text specification draft 9," 11th Meeting: Shanghai, CN, Oct. 10-19, 2012, JCTVC-K1003_v7, 290 pp.

Bross et al., "High Efficiency Video Coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video , Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, Thee International Telecommunication Union. Apr. 2015, 634 pp.

Chen et al., "SHVC Draft Text 1," JCT-VC Meeting; MPEG Meeting; Jan. 14-23, 2013; Geneva, CH; (Joint Collaborative Team on Video Coding of ISO/IEC JTC1/SC29/WG11 and ITU-T SG.16); URL: http://wftp3.itu.int/av-arch/jctvc-site/, No. JCTVC-L1008, Mar. 20, 2013, XP030113953, 33 pp.

Chen et al., "AHG9: On DPB operations in HEVC 3DV and scalable extensions," JCT-VC Meeting; MPEG Meeting; Apr. 18-26, 2013; Incheon, KR; (Joint Collaborative Team on Video Coding of ISO/IEC JTC1/SC29/WG11 and ITU-T SG.16); URL: http://wftp3.itu.int/av-arch/jctvc-site/, No. JCTVC-M0270, Apr. 9, 2013, XP030114227, 5 pp.

Ramasubramonian et al., "MV HEVC/SHVC HLS on DPB operations," JCT-VC Meeting; Jul. 25-Aug. 2, 2013; Vienna, AT; (Joint Collaborative Team on Video Coding of ISO/IEC JTC1/SC29/WG11 and ITU-T SG.16); URL:http://wftp3.itu.int/av-arch/jctvc-site/, No. JCTVC-N0093, Jul. 16, 2013, XP030114540, 5 pp.

Ramasubramonian et al., "MV-HEVC/SHVC HLS: Sub-DPB based DPB operations," JCT-VC Meeting; Oct. 23-Nov. 1, 2013; Geneva, CH; (Joint Collaborative Team on Video Coding of ISO/IEC JTC1/SC29/WG11 and ITU-T SG.16); URL: http://wftp3.itu.int/av-arch/jctvc-site/, No. JCTVC-00217, Oct. 15, 2013, XP030115266, 4 pp.

Sjoberg et al., "Overview of HEVC high-level syntax and reference picture management," IEEE Transactions on Circuits and Systems for Video Technology, Jan. 2012, XP055045360, 14 pp.

Tech et al., "MV-HEVC Draft Text 4," JCT-3V Meeting; Apr. 20-26, 2013; Incheon, KR; (The Joint Collaborative Team on 3D Video Coding Extension Development of ISO/IEC JTC1/SC29/WG11 and ITU-T SG.16); URL: http://phenix.int-evry.fr/jct2/, No. JCT3V-D1004_d0, May 13, 2013, XP030130982, 50 pp.

Hannuksela et al., "3D-AVC Draft Text 8," Geneva, CH; Oct. 25-Nov. 1, 2013 (The Joint Collaborative Team on 3D Video Coding Extension Development of ISO/IEC JTC1/SC29/WG11 and ITU-T SG.16); Nov. 1, 2013; Document JCT3V-F1002_v3, 62 pp.

Tech et al., "Preliminary Version of MV-HEVC Draft Text 6," JCT-3V Meeting; Oct. 25-Nov. 1, 2013; Geneva, CH; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F1004-v1, Nov. 7, 2013, XP030131734, 84 pp.

Tech et al., "3D-HEVC Draft Text 2," Oct. 25-Nov. 1, 2013, Joint Collaboration Team on 3D Video Coding Extension Development of ITU-T SG 16 WP 3 and ISO/IEC JTC 1/SC 29/WG 11, Document: JCT3V-F1001-v4, 6th Meeting; Geneva, CH, Dec. 14, 2013, 94 pp.

Chen et al., "SHVC Working Draft 2," JCT-VC Meeting; MPEG Meeting, Apr. 18-26, 2013, Incheon, KR, (Joint Collaborative Team on Video Coding of ISO/IEC JTC1/SC29/WG11 and ITU-T SG. 16 ), URL: http://wftp3.itu.int/av-arch/jctvc-site/, No. JCTVC-M1008_v1, Jun. 25, 2013, XP030114430, 51 pp.

International Search Report and Written Opinion from International Application No. PCT/US2014/046691, dated Oct. 1, 2014, 12 pp.

Second Written Opinion from International Application No. PCT/US2014/046691, dated Aug. 24, 2015, 23 pp.

International Preliminary Report on Patentability from International Application No. PCT/US2014/046691, dated Nov. 5, 2015, 9 pp.

\* cited by examiner

DECODED PICTURE BUFFER OPERATIONS FOR VIDEO CODING

This application claims the benefit of U.S. Provisional Patent Application No. 61/846,576, filed Jul. 15, 2013, the entire content of which is incorporated by reference herein.

TECHNICAL FIELD

This disclosure relates to techniques for video coding, and more specifically to techniques for multi-layer video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards, to transmit, receive and store digital video information more efficiently.

Extensions of some of the aforementioned standards, including H.264/AVC, provide techniques for multi-layer video coding. Multi-layer video coding techniques may include scalable video coding techniques, multi-view video coding techniques, and multi-view plus depth video coding techniques. In order to produce stereo or three-dimensional ("3D") video, for example, techniques for multiview coding have been proposed for use in AVC, with the scalable video coding (SVC) standard (which is the scalable extension to H.264/AVC), and the multi-view video coding (MVC) standard (which has become the multiview extension to H.264/AVC).

SUMMARY

In general, this disclosure describes techniques for multi-layer video coding. In particular, this disclosure is related to decoded picture buffer (DPB) management for multi-layer video coding.

In one example of the disclosure, a method of decoding video data comprises partitioning a decoded picture buffer (DPB) into a plurality of sub-DPBs, and receiving at least one an indication of a sub-DPB size for the plurality of sub-DPBs for one or more operation points of a multi-layer video coding process.

In another example of the disclosure, an apparatus configured to decode video data comprises a DPB configured to store video data, and a video decoder configured to partition the DPB into a plurality of sub-DPBs, and receive at least one indication of a sub-DPB size for the plurality of sub-DPBs for one or more operation points of a multi-layer video coding process In another example of the disclosure, an apparatus configured to decode video data comprises means for partitioning a DPB into a plurality of sub-DPBs, and means for receiving at least one indication of a sub-DPB size for the plurality of sub-DPBs for one or more operation points of a multi-layer video coding process.

In another example, this disclosure describes a computer-readable storage medium storing instructions that, when executed, cause one or more processors a device configured to decode video data to partition a DPB into a plurality of sub-DPBs, and receive at least one indication of a sub-DPB size for the plurality of sub-DPBs for one or more operation points of a multi-layer video coding process.

In another example of the disclosure, a method of encoding video data comprises reconstructing a plurality of pictures of a plurality of different layer types, storing the plurality of pictures in a DPB, wherein the DPB is partitioned into a plurality of sub-DPBs, and generating at least one indication of a sub-DPB size for the plurality of sub-DPBs for one or more operation points of a multi-layer video coding process.

In another example of the disclosure, an apparatus configured to encode video data comprises a DBP configured to store video data, and a video encoder configured to reconstruct a plurality of pictures of a plurality of different layer types, store the plurality of pictures in the DPB, wherein the DPB is partitioned into a plurality of sub-DPBs, and generate at least one indication of a sub-DPB size for the plurality of sub-DPBs for one or more operation points of a multi-layer video coding process.

In another example of the disclosure, an apparatus configured to encode video data comprises means for reconstructing a plurality of pictures of a plurality of different layer types, means for storing the plurality of pictures in a DPB, wherein the DPB is partitioned into a plurality of sub-DPBs, and means for generating at least one indication of a sub-DPB size for the plurality of sub-DPBs for one or more operation points of a multi-layer video coding process In another example, this disclosure describes a computer-readable medium storing instructions that, when executed, cause one or more processors of a device configured to encode video data to reconstruct a plurality of pictures of a plurality of different layer types, store the plurality of layer pictures in the DPB, wherein the DPB is partitioned into a plurality of sub-DPBs, and generate at least one indication of a sub-DPB size for the plurality of sub-DPBs for one or more operation points of a multi-layer video coding process.

The details of one or more examples are set forth in the accompanying drawings and the description below. Other features, objects, and advantages will be apparent from the description and drawings, and from the claims.

DETAILED DESCRIPTION

Figure 1:
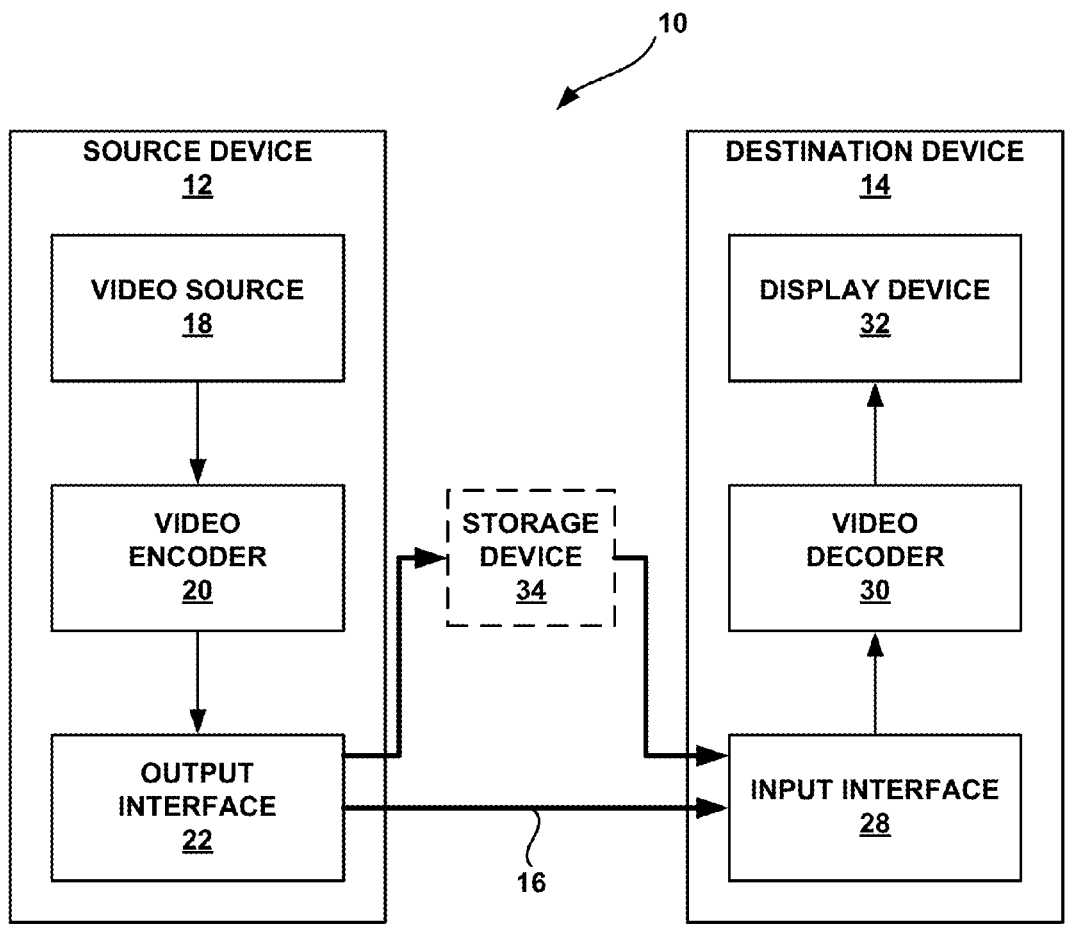
FIG. 1 is a block diagram illustrating an example video encoding and decoding system that may utilize the techniques described in this disclosure.

In general, this disclosure describes techniques for the management of decoded picture buffers (DPBs) in multi-layer video coding. In particular, this disclosure describes various techniques for the management of sub-units of a DPB (also called sub-DPBs). As will be described in more detail below, in various examples of this disclosure, a DBP may be partitioned into a plurality of sub-DPBs, and each sub-DPB may be configured to hold pictures of one type of layer of decoded video data.

In the context of this disclosure, a layer may be a base layer or one or more enhancement layers in a scalable video coding process. Example scalable video coding processes include H.264/SVC (scalable video coding) and scalable extensions of the high efficiency video coding (HEVC) standard, such as Scalable HEVC (SHVC). In addition, a layer may refer to one or more texture views in multi-view or 3D video coding. In addition, a depth view in 3D video coding may also be considered a layer. As another example, a layer may correspond to a single view that includes both texture view components and depth view components. Example multi-view coding processes include H.264/MVC (multi-view coding) and multi-view extensions of the HEVC standard, such as multi-view HEVC (MV-HEVC).

Thus, the term "layer" is generally used in this disclosure to refer to base and/or enhancement layers in the sense of scalable video coding, or texture views and/or depth views in the sense of 3D and multi-view video coding. Accordingly, the term multi-layer video coding generally refers to scalable video coding techniques, multi-view video coding techniques, and 3D video coding techniques, including multi-view plus depth coding. The techniques of this disclosure may apply to any such video coding scenarios, including multi-view extensions, 3D video extensions, and scalable extensions of HEVC and/or H.264/AVC.

The techniques described below may be applied to scalable, multiview and 3D video coding techniques based on advanced codecs, including the coding of two or more views of a picture with depth maps. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely the High-Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The HEVC standard is described in ITU-T H.265, SERIES H: AUDIOVISUAL AND MULTIMEDIA SYSTEMS, Infrastructure of Audiovisual Services—Coding of Moving Video, "High Efficiency Video Coding," April 2013 (hereinafter, "HEVC").

Various extensions to HEVC have been proposed. One such extension is the HEVC Range Extension, described in "High Efficiency Video Coding (HEVC) Range Extensions text specification: Draft 4," JCTVC-N1005_v1, April 2013 (hereinafter, "JCTVC-N1005"). A recent Working Draft (WD) of the scalable HEVC (SHVC), standard, entitled "High efficiency video coding (HEVC) scalable extension draft 3," Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, and referred to as SHVC WD3 hereinafter, is available from http://phenix.it-sudparis.eu/jct/doc_end_user/documents/14_Vienna/wg11/JCTVC-N1008-v3.zip. A multiview extension to HEVC, namely MV-HEVC, is also being developed by the JCT-3V. One Working Draft of MV-HEVC (hereinafter WD4), is available from http://phenix.it-sudparis.eu/jct2/doc_end_user/documents/4_Incheon/wg11/JCT3V-D1004-v3.zip. A more recent working draft of MV-HEVC, titled "MV-HEVC Draft Text 8," Joint Collaborative Team on 3D Video Coding Extensions of ITU-T SG 16 WP3 and ISO/IEC JTC 1/SC 29/WG11, $8^{th}$ Meeting: Valencia, ES, 29 Mar.-4 Apr. 2014, is available from http://phenix.it-sudparis.eu/jct3v/doc_end_user/documents/8_Valencia/wg11/JCT3V-H0002-v1.zip.

FIG. 1 is a block diagram illustrating an example video encoding and decoding system 10 that may utilize the techniques for decoded picture buffer management in multi-layer video coding described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure for decoded picture buffer management in multi-layer video decoding are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard, and may conform to the HEVC Test Model (HM). In particular, in some examples, video encoder 20 and video decoder may operate according to extensions of HEVC that support scalable, multiview, and/or multiview plus depth video coding. In other examples, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, including H.264/SVC. The techniques of this disclosure, however, are not limited to any particular coding standard. Other examples of video compression standards include MPEG-2 and ITU-T H.263. In particular, in accordance with techniques of this disclosure, video encoder 20 and video decoder 30 may operate according to a video coding standard capable of scalable (e.g., SHVC) and/or multiview encoding (e.g., MV-HEVC).

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The following section of the disclosure will provide a background of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks (also called coding tree blocks (CTBs) or largest coding units (LCUs)) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU generally corresponds to a size of the coding node and must typically be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector, which may be indicated by a prediction direction.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., CTB, LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

HEVC extensions are also currently under development in JCT-3V and JCT-VC. In JCT-3V, two multiview-related HEVC extensions, the multiview extension (MV-HEVC) and 3D video extension (3D-HEVC) are being developed. In addition, two AVC extensions, the MVC+D and 3D-AVC are being developed.

Example versions of the ongoing standards are listed as follows:

T. Suzuki, M. M. Hannuksela, Y. Chen, S. Hattori, G. Sullivan, "MVC Extension for Inclusion of Depth Maps Draft Text 6," JCT3V-C1001, Joint Collaborative Team on 3D Video Coding Extension Development of ITU-T SG 16 WP 3 and ISO/IEC JTC 1/SC 29/WG 11, 4th meeting, available at http://phenix.int-evry.fr/jct2/doc_end_user/documents/3_Geneva/wg11/JCT3V-C1001-v3.zip.

M. M. Hannuksela, Y. Chen, T. Suzuki, J.-R. Ohm, G. Sullivan, "3D-AVC Draft Text 8," JCT3V-F1002, Joint Collaborative Team on 3D Video Coding Extension Development of ITU-T SG 16 WP 3 and ISO/IEC JTC 1/SC 29/WG 11, 6th Meeting, available at http://phenix.int-evey.fr/jct2/doc_end_user/documents/6_Geneva/wg11/JCT3V-F1002-v3.zip.

JCT3V-F1004, "MV-HEVC Draft Text 6," G. Tech, K. Wegner, Y. Chen, M. Hannuksela, Joint Collaborative Team on 3D Video Coding Extension Development of ITU-T SG 16 WP 3 and ISO/IEC JTC 1/SC 29/WG 11, 6th Meeting, available at http://phenix.int-evey.fr/jct2/doc_end_user/documents/6_Geneva/wg11/JCT3V-F1004-v6.zip.

Gerhard Tech, Krzysztof Wegner, Ying Chen, Sehoon Yea, "3D-HEVC Draft Text 2," JCT3V-F1001, Joint Collaborative Team on 3D Video Coding Extension Development of ITU-T SG 16 WP 3 and ISO/IEC JTC 1/SC 29/WG 11, 6th Meeting, available at http://phenix.int-evry.fr/jct2/doc_end_user/documents/6_Geneva/wg11/JCT3V-F1001-v2.

Multiview video coding techniques of extensions of the H.264/Advanced Video Coding (AVC) standard will now be discussed. However, the techniques of this disclosure may be applicable with any video coding standard that supports multiview coding and/or 3D coding multiview proposals for the emerging HEVC standard (e.g., MV-HEVC and 3D-HEVC).

Figure 2:
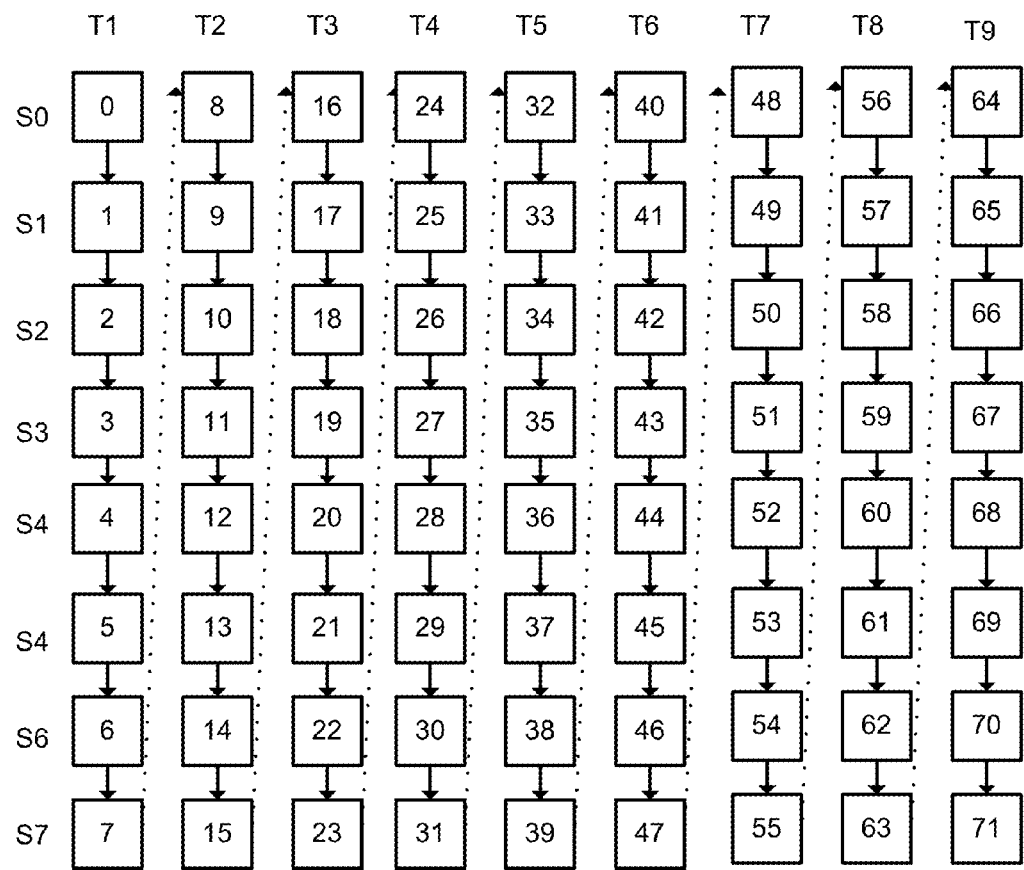
FIG. 2 is a conceptual diagram illustrating an example multiview decoding order.

Multiview video coding (MVC) is an extension of H.264/AVC. A typical MVC decoding order (i.e., a bitstream order) is shown in FIG. 2. The decoding order arrangement is referred as time-first coding. Note that the decoding order of access units may not be identical to the output order or display order of the access units. In FIG. 2, S0-S7 each refer to different views of the multiview video. T1-T9 each represents one output time instance. An access unit may include the coded pictures of all the views for one output time instance. For example, a first access unit may include all of the views S0-S7 for time instance T1, a second access unit may include all of the views S0-S7 for time instance T2, and so forth.

For purposes of brevity, the disclosure may use the following definitions:

view component: A coded representation of a view in a single access unit. When a view includes both a coded texture representation and a depth representation, a view component may include a texture view component and a depth view component.

texture view component: A coded representation of the texture of a view in a single access unit.

depth view component: A coded representation of the depth of a view in a single access unit.

As discussed above, in the context of this disclosure, each of a view component, texture view component, and a depth view component may be generally referred to as a layer. In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two types of pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as being part of a same view as the depth component in a single access unit.

The texture view component includes the actual image content that is displayed. For example, the texture view component may include luma (Y) and chroma (Cb and Cr) components. The depth view component may indicate relative depths of the pixels in the depth view component's corresponding texture view component. As one example, the depth view component is a gray scale image that includes only luma values. In other words, the depth view component may not convey any image content, but rather provide a measure of the relative depths of the pixels in the corresponding texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels, such that an increase in the darkness of the shade of gray of a pixel in the depth view is indicative of an increase in the level of depth associated with the corresponding pixel in the texture view. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In other examples, any technique may be utilized to indicate relative depths of the pixels in the texture view component.

Figure 3:
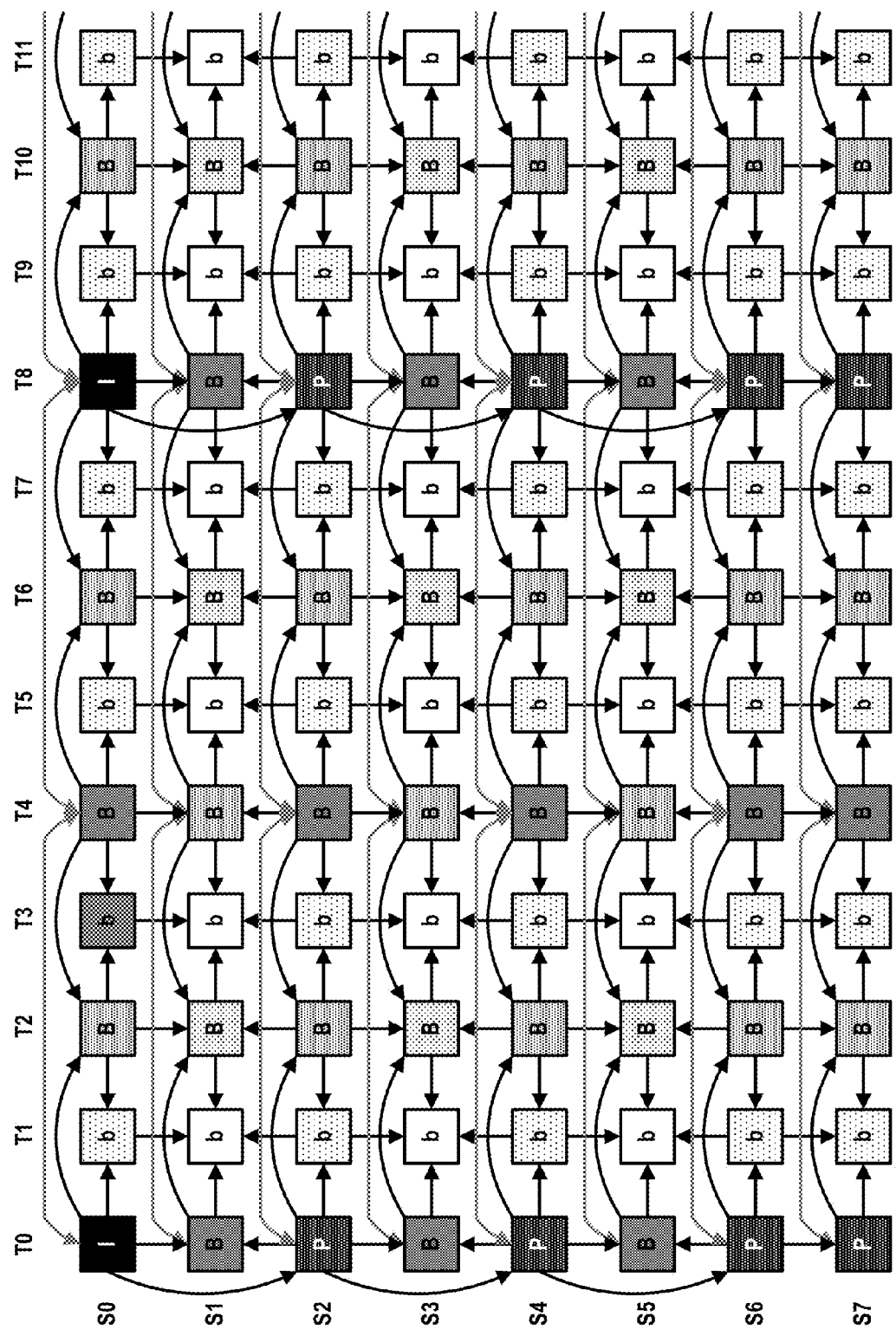
FIG. 3 is a conceptual diagram illustrating an example prediction structure for multiview coding.

A typical MVC prediction structure (including both inter-picture prediction within each view and inter-view prediction) for multi-view video coding is shown in FIG. 3. Prediction directions are indicated by arrows, the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs could be supported also by MVC, the advantage of MVC is that MVC can support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of a proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 3 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views may also be supported by MVC. One of the advantages of MVC is that an MVC encoder may take more than two views as a 3D video input and an MVC decoder may decode such a multiview representation. As such, any renderer with an MVC decoder may decode 3D video content with more than two views.

As discussed above, in MVC, inter-view prediction is allowed among pictures in the same access unit (meaning, in some instances, with the same time instance). When coding a picture in one of the non-base views, a picture may be added into a reference picture list, if it is in a different view but within a same time instance. An inter-view prediction reference picture may be put in any position of a reference picture list, just like any inter-prediction reference picture. As shown in FIG. 3, a view component can use the view components in other views for reference. In MVC, inter-view prediction is realized as if the view component in another view was an inter-prediction reference.

As shown in FIG. 3, a view component can use the view components in other views for reference. This is called inter-view prediction. In MVC, inter-view prediction is realized as if the view component in another view was an inter prediction reference. The potential inter-view references, however, are signaled in the Sequence Parameter Set (SPS) MVC extension (as shown in Table 1) and can be modified by the reference picture list construction process, which enables flexible ordering of the inter prediction or inter-view prediction references.

TABLE 1

SPS MVC Extension Syntax Table

| seq_parameter_set_mvc_extension( ) { | Descriptor |
|---|---|
|   num_views_minus1 | ue(v) |
|   for( i = 0; i <= num_views_minus1; i++ ) | |
|     view_id[ i ] | ue(v) |
|   for( i = 1; i <= num_views_minus1; i++ ) { | |
|     num_anchor_refs_l0[ i ] | ue(v) |
|     for( j = 0; j < num_anchor_refs_l0[ i ]; j++ ) | |
|       anchor_ref_l0[ i ][ j ] | ue(v) |
|     num_anchor_refs_l1[ i ] | ue(v) |
|     for( j = 0; j < num_anchor_refs_l1[ i ]; j++ ) | |
|       anchor_ref_l1[ i ][ j ] | ue(v) |
|   } | |
|   for( i = 1; i <= num_views_minus1; i++ ) { | |
|     num_non_anchor_refs_l0[ i ] | ue(v) |
|     for( j = 0; j < num_non_anchor_refs_l0[ i ]; j++ ) | |
|       non_anchor_ref_l0[ i ][ j ] | ue(v) |
|     num_non_anchor_refs_l1[ i ] | ue(v) |
|     for( j = 0; j < num_non_anchor_refs_l1[ i ]; j++ ) | |
|       non_anchor_ref_l1[ i ][ j ] | ue(v) |
|   } | |
|   num_level_values_signalled_minus1 | ue(v) |
|   for( i = 0; i <= num_level_values_signalled_minus1; i++ ) | |
|   { | |
|     level_idc[ i ] | u(8) |
|     num_applicable_ops_minus1[ i ] | ue(v) |

TABLE 1-continued

SPS MVC Extension Syntax Table

| seq_parameter_set_mvc_extension( ) { | Descriptor |
|---|---|
|     for( j = 0; j <= num_applicable_ops_minus1[ i ]; j++ ) { | |
|         applicable_op_temporal_id[ i ][ j ] | u(3) |
|         applicable_op_num_target_views_minus1[ i ][ j ] | ue(v) |
|         for( k = 0; k <= applicable_op_num_target_views_minus1[ i ][ j ]; k++ ) | |
|             applicable_op_target_view_id[ i ][ j ][ k ] | ue(v) |
|         applicable_op_num_views_minus1[ i ][ j ] | ue(v) |
|         } | |
|     } | |
| } | |

In the SPS MVC extension, for each view, the number of views that can be used to form reference picture list 0 and reference picture list 1 are signaled. Prediction relationships for an anchor picture, as signaled in the SPS MVC extension, can be different from the prediction relationship for a non-anchor picture (signaled in the SPS MVC extension) of the same view.

The next section will discuss multi-view and 3D video coding with respect to HEVC. In particular, example techniques of this disclosure are applicable when coding two or more views. The plurality of video pictures for each view may be referred to as texture view components. For 3D-HEVC, each texture view component may have a corresponding depth view component. MV-HEVC does not use depth view components. The texture view components include video content (e.g., luma and chroma components of pixel values), and the depth view components may indicate relative depths of the pixels within the texture view components.

Example techniques of this disclosure relate to coding 3D video data by coding texture data, or texture data and depth data. In general, the term "texture" is used to describe luminance (that is, brightness or "luma") values of an image and chrominance (that is, color or "chroma") values of the image. In some examples, a texture image may include one set of luminance data and two sets of chrominance data, for blue hues (Cb) and red hues (Cr). In certain chroma formats, such as 4:2:2 or 4:2:0, the chroma data is downsampled relative to the luma data. That is, the spatial resolution of chrominance components is lower than the spatial resolution of corresponding luminance components, e.g., one-half or one-quarter of the luminance resolution.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in a second view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to present a slight perception of depth, or may be displayed in different locations for the left and right eye (e.g., with horizontal disparity that is opposite that of pixels located in front of the zero disparity plane). Many other techniques may also be used to convey or define depth data for an image.

For each pixel in the depth view component, there may be one or more corresponding pixels in the texture view component. For instance, if the spatial resolutions of the depth view component and the texture view component are the same, each pixel in the depth view component corresponds to one pixel in the texture view component. If the spatial resolution of the depth view component is less than that of the texture view component, then each pixel in the depth view component corresponds to multiple pixels in the texture view component. The value of the pixel in the depth view component may indicate the relative depth of the corresponding one or more pixels in the texture view.

In some examples, a video encoder signals video data for the texture view components and the corresponding depth view components for each of the views. A video decoder utilizes both the video data of texture view components and the depth view components to decode the video content of the views for display. A display then displays the multiview video to produce 3D video.

Figure 4:
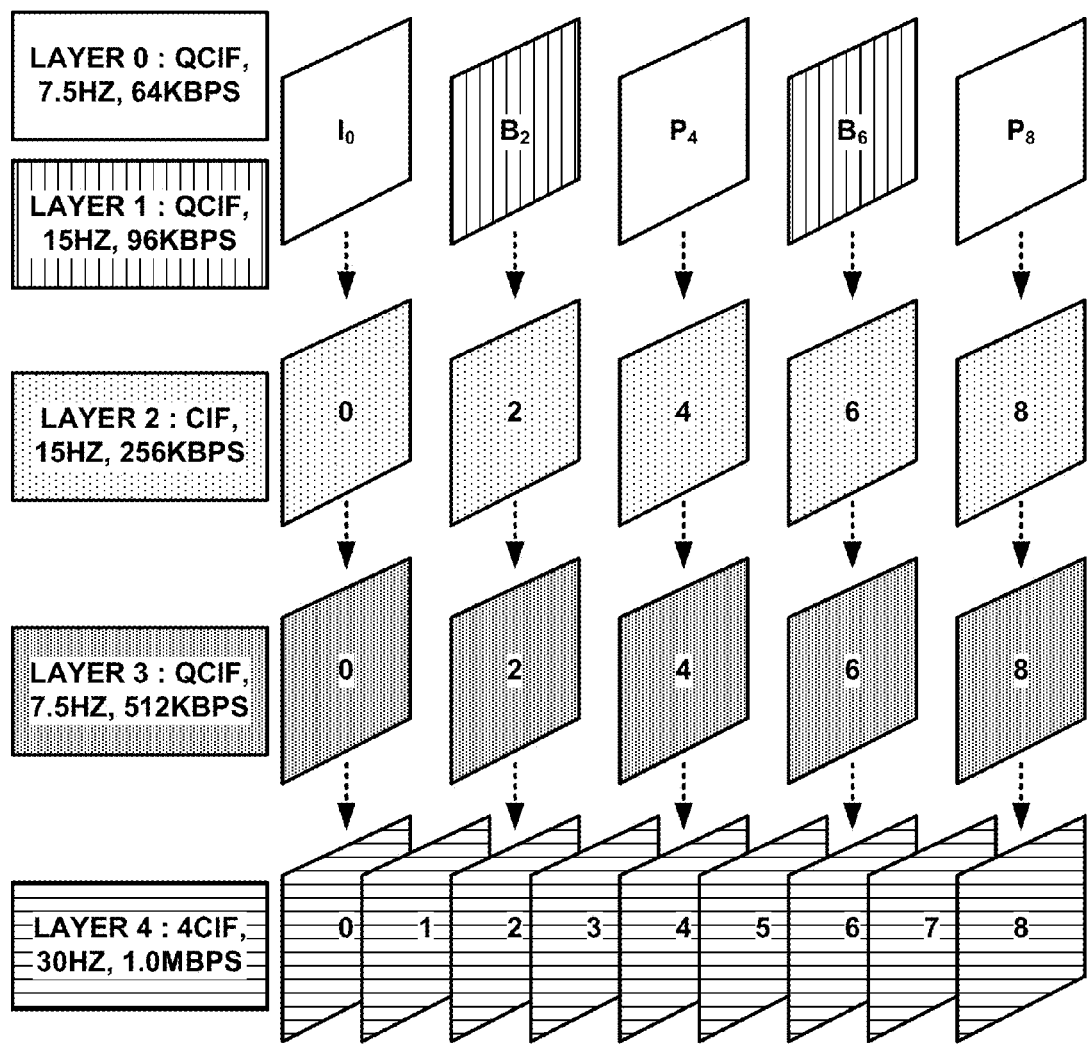
FIG. 4 is a conceptual diagram illustrating example scalable video coding layers.

Scalable extensions of HEVC are also being developed by JCT-VC. FIG. 4 is a conceptual diagram illustrating one example of scalable video coding. While FIG. 4 is described with respect to H.264/AVC and SVC, it should be understood that similar layers may be coded using other multi-layer video coding schemes, including scalable extension of HEVC. The example of FIG. 4 shows layers coded using the same codec. In other examples, layers may be coded using a multi-standard codec. For example, a base layer may be coded using H.264/AVC, while an enhancement layer may be coded using a scalable extension to HEVC. Thus, references to SVC below may apply to scalable video coding in general, and are not restricted to H.264/SVC.

In SVC, scalabilities may be enabled in three dimensions including, for example, spatial, temporal, and quality (represented as a bit rate or signal to noise ratio (SNR)) dimensions. In general, better representation can be normally achieved by adding to a representation in any dimension. For example, in the example of FIG. 4, layer 0 is coded at Quarter Common Intermediate Format (QCIF) having a frame rate of 7.5 Hz and a bit rate of 64 kilobytes per second (KBPS). In addition, layer 1 is coded at QCIF having a frame rate of 15 Hz and a bit rate of 64 KBPS, layer 2 is coded at CIF having a frame rate of 15 Hz and a bit rate of 256 KBPS, layer 3 is coded at QCIF having a frame rate of 7.5 Hz and a bit rate of 512 KBPS, and layer 4 is coded at 4CIF having a frame rate of 30 Hz and a bit rate of Megabyte per second (MBPS). It should be understood that the particular number, contents and arrangement of the layers shown in FIG. 4 are provided for purposes of example only.

In any case, once a video encoder (such as video encoder 20) has encoded content in such a scalable way, a video decoder (such as video decoder 30) may use an extractor tool to adapt the actual delivered content according to application requirements, which may be dependent e.g., on the client or the transmission channel.

In SVC, pictures having the lowest spatial and quality layer are typically compatible with H.264/AVC. In the example of FIG. 4, pictures with the lowest spatial and quality layer (e.g., pictures in layer 0 and layer 1, with QCIF resolution) may be compatible with H.264/AVC. Among them, those pictures of the lowest temporal level form the temporal base layer (e.g., layer 0). This temporal base layer (e.g., layer 0) may be enhanced with pictures of higher temporal levels (e.g., layer 1).

In addition to the H.264/AVC compatible layer, several spatial and/or quality enhancement layers may be added to provide spatial and/or quality scalabilities. Each spatial or quality enhancement layer itself may be temporally scalable, with the same temporal scalability structure as the H.264/AVC compatible layer.

A described above, the term "layer" is generally used in this disclosure to refer to individual base layers or individual enhancement layers in the sense of scalable video coding, or texture views and/or depth views in the sense of 3D and multi-view video coding. Once pictures for each of the layers (e.g., MV-HEVC layers or SHVC layers), is decoded, e.g., by video decoder 30 or the reconstruction loop of video encoder 20, pictures for the decoded layer are stored in a DPB. A DPB is a buffer or memory that is used to store pictures, and within this disclosure, pictures of decoded layers when using multi-layer video coding techniques. The pictures of the decoded layers stored in the DPB may be used as references for inter-prediction (including motion compensation, inter-view and inter-layer prediction), for output reordering, and output delay.

In accordance with various examples of this disclosure, a DPB may be partitioned into sub-units (e.g., called sub-DPBs). Each sub-DPB may then be configured to store a picture(s), or more generally, picture information, for a particular layer type. For example, a DPB may be partitioned such that one sub-DPB is configured to store pictures of a base layer for a scalable video coding process. Another sub-DPB may be configured to store pictures of a first enhancement layer of a scalable video coding process. Yet another sub-DPB may be configured to store pictures of a second enhancement layer of a scalable video coding process, and so on.

Figure 5:
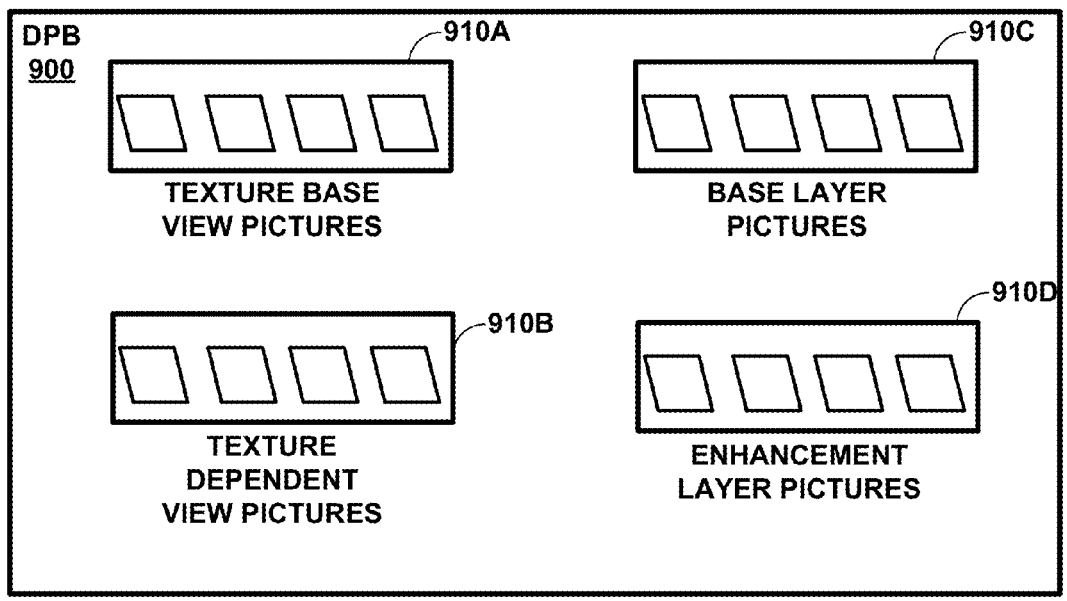
FIG. 5 is a conceptual diagram showing an example DPB according to examples of the disclosure.

FIG. 5 is a conceptual diagram showing a DPB 900 configured to store different decoded layer components (e.g., pictures for different layer types) in different sub-units. DPB 900 may form part of a video decoder and/or video encoder (e.g., video encoder 20 and video decoder 30). Each of sub-DPBs 910A-D represents storage locations for picture(s) of different types of decoded layers. For example, sub-DPB 910A may be configured to store one or more texture pictures of a base view for an MV-HEVC compatible video bitstream, while sub-DPB 910B may be used for storing texture pictures of a dependent view for the MV-HEVC compatible video bitstream. Similarly, sub-DPB 910C may be used for storing pictures of a base layer in a scalable video coding process (e.g., SHVC), while sub-DPB 910D may be used for storing one level of pictures for an enhancement layer in the scalable video coding process. Additional sub-DPBs may be configured to store pictures of additional levels of enhancement layer or pictures of additional texture dependent views. Each of sub-DPBs 910A-D contains separate units that are configured to store one or more pictures of a decoded layer for the particular layer type associated with the sub-DPB.

Video decoder 30 may be further configured to remove pictures of decoded layers from the plurality of sub-DPBs 910A-D. In some examples, the removal of pictures from each given sub-DPB (e.g., sub-DPB 910A) may be managed separately. In other examples, pictures may be removed from one or more sub-DPBs based on an operation point. A particular operation point is associated with a particular number of layers that are decoded for a particular picture to be output. For example, for SHVC, one operation point may only require a picture of a base layer to be decoded. In another operation point for SHVC, a picture of a base layer and pictures of one or more enhancement layers may be decoded to produce an output picture. In the operation point requiring both a picture of a base layer and pictures of one or more enhancement layers, removal of pictures may be performed for every sub-DPB used for that operation point (i.e., every sub-DPB which stores pictures for a layer that is used for the picture to be output). That is, a picture of a base layer and the corresponding pictures of the one or more enhancement layers associated with a given operation point may be removed from their respective sub-DPBs at the same time.

Video encoder 20 and video decoder 30 may be further configured to mark decoded layer components (e.g., pictures of layers) as unused for reference or used for reference in the plurality of sub-DPBs 910A-D. Again, the process for marking pictures as unused for reference may be performed separately for each sub-DPB. That is, video encoder 20 and video decoder 30 may be configured to perform a marking process on the pictures in each of the plurality of sub-DPBs independently, wherein the marking process marks pictures as used for reference or marks the pictures as unused for reference. In another example, the marking process may be performed for all sub-DPBs storing pictures for a particular number of layers related to a particular operation point.

In HEVC, and other video coding standards, the operation of DPB 900 is often specified in relation to a hypothetical reference decoder (HRD). Video encoder 20 and video decoder 30 may be configured to manage DPB 900 to perform various actions, including marking decoded pictures stored in DPB 900 as "unused for reference" (i.e., unable to be used as a reference picture for an inter prediction process), marking a decoded picture for output (e.g., to display device 32), and marking a decoded picture for removal from DPB 900 (also known as "bumping"). A picture is typically removed (i.e., bumped) from DPB 900 when the picture is no longer needed as a reference picture for inter-prediction and no longer needed for output.

The conformance of bitstreams is specified by defining the behavior of the HRD. DPB 900 may be considered to be a component of the HRD. As described above, DPB 900 may be implemented as one or more memory units configured to store reconstructed pictures in a video encoder (e.g., video encoder 20) or decoded pictures in a video decoder (e.g., video decoder 30). In some proposals for SHVC and MV-HEVC, DPB operations are not clearly specified, but a simple assumption is that all pictures with the same output time arrive in DPB 900 (i.e., are store in DPB 900) at the same time instant. The output of pictures from DPB 900 is determined based on how HRD parameters are defined.

For example, HRD parameters may be defined for output order conformance. As one example, the output order of decoded layer pictures may be specified by one or more syntax elements whose value specifies the number of pictures present for a particular layer. As another example, for output time conformance, the output time may be specified by one or more syntax elements whose values indicate picture output times. Video decoder 30 may be configured to derive HRD settings from the values of parameters signaled in an encoded video bitstream. The HRD parameters may be signaled in a data format structure (e.g., called hrd_parameters( )). Example parameters may include a buffering period supplemental enhancement information (SEI) message and a picture timing SEI message. In some examples, a sub-picture decoding SEI message may also be defined. In some examples, the output of the pictures in DPB 900 occurs such that all pictures associated with the same output time are output at the same instant. In examples of this disclosure, pictures in different sub-DPBs may be output at the same time in the case that each sub-DPB is associated with the same output time.

In some example proposals for HEVC, parameters that are related to DPB operations are signaled in one or more of a sequence parameter set (SPS) and/or a video parameter set (VPS). An SPS is a syntax structure that contains syntax elements that apply to zero or more entire coded video sequences (CVSs) as indicated by the values of syntax elements found in a picture parameter set (PPS) and/or a slice header. A VPS is a syntax structure containing syntax element that applies to zero or more entire CVSs as determined by the value of syntax element found in an SPS, PPS, and/or slice header. In general, syntax elements signaled in a VPS will apply to a greater number of pictures than the number of pictures to which syntax element signaled in an SPS apply. A CVS is a sequence of access units that consist, in decoding order, of an access unit (AU) containing a random access picture followed by zero or more other AIls that do not include a random access picture. An access unit is a set of network abstraction layer (NAL) units that are consecutive in decoding order and contain exactly one coded picture.

Example syntax elements that are related to DPB operations include, but are not limited to, the max_dec_pic_buffering_minus1 syntax element, the max_num_reorder_pics syntax element, and the max_latency_increase_plus1 syntax element, which may each be signaled in the SPS and/or in the VPS. The value of the max_dec_pic_buffering_minus1 syntax element specifies the maximum required size of the DPB for a CVS in units of picture buffers. That is, a DPB or sub-DPB may be partitioned into one or more picture buffers, where each picture buffer stores a picture (e.g., a decoded layer picture). In some examples, the value of max_dec_pic_buffering_minus1 is limited to a range of 0 to some predetermined maximum DPB size. The value of the max_num_reorder_pics syntax element specifies the maximum allowed number of pictures that can precede any picture in the CVS in decoding order and follow that same picture in output order. The value of the max_latency_increase_plus1 syntax element, when not equal to zero, is used to determine the maximum number of pictures that can precede any picture in the CVS in output order and follow that same picture in decoding order.

Some example proposals for HEVC allow the signaling of the aforementioned DPB parameters for each sub-layer, for example, if the value of the sub_layer_ordering_info_present_flag is equal to 1. A sub-layer is a temporal scalable layer of temporal scalable bitstream (e.g., a base layer or enhancement layer of an SHVC bitstream). According to this example proposal, when sub-layer signaling is allowed, only one value is signaled for each of the syntax elements, and the signaled value of each of these syntax elements (i.e., the max_dec_pic_buffering_minus1 syntax element, the max_num_reorder_pics syntax element, and the max_latency_increase_plus1 syntax element) is inferred (i.e., determined without the receipt of explicit signaling) to be the same for all temporal sub-layers. Otherwise, when sub-layer signaling is not allowed (e.g., the value of syntax element sub_layer_ordering_info_present_flag is equal to 0), the values of the DPB syntax elements are explicitly signaled for each sub-layer. The signaling of these parameters in the SPS is highlighted in Table 2 below in italics. Similar signaling may be used in the VPS.

TABLE 2

DPB Parameters in the SPS

| seq_parameter_set_rbsp( ) { | Descriptor |
| --- | --- |
|     sps_video_parameter_set_id | u(4) |
|     if( nuh_layer_id = = 0 ) { | |
|         sps_max_sub_layers_minus1 | u(3) |
|         sps_temporal_id_nesting_flag | u(1) |
|         profile_tier_level( 1, sps_max_sub_layers_minus1 ) | |
|     } | |
|     sps_seq_parameter_set_id | ue(v) |
|     chroma_format_idc | ue(v) |
|     if( chroma_format_idc = = 3 ) | |
|         separate_colour_plane_flag | u(1) |
|     pic_width_in_luma_samples | ue(v) |
|     pic_height_in_luma_samples | ue(v) |
|     conformance_window_flag | u(1) |
|     if( conformance_window_flag ) { | |
|         conf_win_left_offset | ue(v) |
|         conf_win_right_offset | ue(v) |
|         conf_win_top_offset | ue(v) |
|         conf_win_bottom_offset | ue(v) |
|     } | |
|     bit_depth_luma_minus8 | ue(v) |
|     bit_depth_chroma_minus8 | ue(v) |

TABLE 2-continued

DPB Parameters in the SPS

| seq_parameter_set_rbsp( ) { | Descriptor |
|---|---|
|     log2_max_pic_order_cnt_lsb_minus4 | ue(v) |
|     sps_sub_layer_ordering_info_present_flag | u(1) |
|     for( i = ( sps_sub_layer_ordering_info_present_flag ? 0 : sps_max_sub_layers_minus1 ); i <= sps_max_sub_layers_minus1; i++ ) { | |
|         sps_max_dec_pic_buffering_minus1[ i ] | ue(v) |
|         sps_max_num_reorder_pics[ i ] | ue(v) |
|         sps_max_latency_increase_plus1[ i ] | ue(v) |
|     } | |
|     ... | |

In the base version of HEVC (sometimes called HEVC 1), only a single layer is present (e.g., as indicated by syntax element nuh_layer_id having a value equal to 0), and therefore, the layer set decoded and the layer set output are the same. In the context of multi-layer video coding (e.g. SHVC or MV-HEVC), the number of layer sets and output layers sets, are not necessarily the same, as the total number of layer sets may not all be output for every operation point. That is, SHVC operation points often include the decoding of a base layer and one or more enhancement layers. Similarly, MV-HEVC operation points often include the decoding of two or more views. However, not all layers or views may be used to output a given picture. In view of this feature, this disclosure proposes signaling DPB and/or sub-DPB sizes in the VPS, since the DPB size is a cross-layer property. That is, the number of layers that are decoded and output together may require different DPB sizes. Since the layer sets needed for one or more operations points are signaled at the VPS level, signaling efficiency can be achieved by signaling at least one indication of sub-DPB size for one or more operation points at the VPS level as well. Since the indication of sub-DPB size is signaled for operation points, signaling such an indication at a lower level syntax structure (e.g., an SPS, PPS, or slice header) may result in redundant signaling of the sub-DPB size, since the layer sets for the operation points only change at the VPS level.

Techniques for the removal of pictures from the DPB will now be discussed. Examples techniques for HEVC involve two ways of specifying the removal of pictures from the DPB. They include a picture-based DPB removal process and an AU-based DPB removal process. In a picture-based DPB removal process, pictures in one AU may be individually removed at different times. In an AU-based DPB removal pictures, all pictures in the AU are removed at the same time. Current proposals for DPB removal operations for SHVC and MV-HEVC do not clearly specify how pictures are to be removed.

Current proposals for DPB signaling and operation for MV-HEVC and SHVC exhibit the following problems. Initially, many aspects of DPB operations are not clearly specified, especially in view of the potential for different requirements for DPB operations in multi-layer video coding processes given the multitude of different possible operation points.

Furthermore, current proposals for DPB operations in multi-layer coding processes are defined in a layer-specific manner, which may be inflexible and sub-optimal for all operation points. For example, in some proposals for DPB operations, a picture may be marked as "unused for reference" only for a picture in the same layer or in the same AU.

As another example, in the bumping process for one proposal for MV-HEVC, a video decoder is required to determine a decoded picture size for the current layer signaled, and may only apply the bumping process for the pictures in the same layer of the currently decoded picture.

As another drawback, DPB sizes are currently signaled in the SPS. However, since DPB sizes may be specific to a certain operation point, signaling DPB sizes in the SPS is duplicative and inefficient. In some examples, operation points are defined at the VPS level. As described above, the techniques of this disclosure include signaling at least one indication of a sub-DPB size for one or more operation points. Since layer sets for the operation points are defined at the VPS level, if an indication of sub-DPB size were signaled in a lower level syntax structure (e.g., in an SPS), multiple occurrences of the same indication of sub-DPB size would be signaled for each layer set defined in a VPS. As such, in this example, signaling an indication of a sub-DPB size for an operation point may be redundant if such an indication is signaled at a level lower than the VPS.

As yet another drawback, current proposals for DPB operations in multi-layer video coding do not distinguish between pictures with different spatial resolutions, bit depths and color formats. This may be inefficient, as this typically requires the designer of a video decoder to allocate a size for each picture storage buffer so as to support the worst-case scenario (i.e., each picture buffer must be large enough to store the picture with the largest possible size).

Furthermore, H.264/SVC uses single loop coding and only uses a single DPB. H.264/MVC employs multi-loop coding, but still uses a single DPB to store pictures for all layers. In general, prior multi-layer coding techniques do not include DPB management signaling and operations to handle a DPB partitioned into sub-DPBs configured to store different layer types.

In view of these drawbacks, this disclosure proposes systems, methods, and techniques for signaling and performing DPB operations in a multi-layer video coding process. In particular, various examples of the disclosure relate to systems, methods, and techniques for performing DPB operations on a DPB partitioned into sub-DPBs, each sub-DPB being configured to store pictures for one type of layer, as was described above with reference to FIG. 5.

As will be described in more detail below, the various example techniques of this disclosure include signaling and/or or generally indicating at least one sub-DPB size for each operation point of a multi-layer video coding process. The example techniques of this disclosure also include techniques for sub-DPB operations per operation point. By using the techniques of this disclosure, DPB management in a multi-layer video coding process may be handled more efficiently. In particular, instead of using a maximum possible capacity for all sub-DPBs, signaling and/or inferring sub-DPB sizes may allow for more efficient allocation of memory space.

In accordance with the examples described below, video encoder 20 and video decoder 30 may be configured to perform techniques that provide mechanisms to support sub-DPB level DPB operations in multi-layer video coding processes. Example techniques of this disclosure include techniques for indicating sub-DPB sizes for various operation points of a multi-layer video coding process, for example, by generating and signaling one or more syntax elements.

In one example of the disclosure, video encoder 20 may be configured to generate syntax elements whose respective values indicate the respective size of sub-DPBs. In a particular example, video encoder 20 may be configured to generate at least one syntax element that indicates the respective sub-DPB size that is to be used by video decoder 30 for each operation point of a multi-layer video coding process. Video decoder 30 may be configured to receive the at least one sub-DPB size syntax element generated by video encoder 20, and to allocate memory space for each sub-DPB for a given operation point in accordance with the value of the sub-DBP size syntax element.

As described above with reference to FIG. 5, a DPB may be partitioned into multiple sub-DPBs, each sub-DPB configured to store pictures of a particular type of layer. For example, one sub-DPB may be configured to store pictures of a base layer for a scalable video coding process (e.g., SHVC), and another sub-DPB may be configured to store pictures of a first level of enhancement layer for the scalable video coding process. Additional sub-DPBs may be partitioned to store pictures of additional levels of enhancement layer pictures. Likewise, one sub-DPB may be configured to store pictures of a base view for a multi-view video coding process (e.g., MV-HEVC), and another sub-DPB may be configured to store pictures of a reference view of the multi-view view coding process. Additional sub-DPBs may be partitioned to store pictures of additional reference view.

In other examples of the disclosure, video decoder 30 may be configured to partition a DPB into sub-DPBs that are configured to store pictures according to other criteria. For example, video decoder 30 may partition a DPB into a plurality of sub-DPBs, wherein each sub-DPB is configured to hold pictures that have the same color format, resolution, or bit depth. For example, video decoder 30 may be configured to partition a DPB into sub-DBPs by layer type, i.e., where each sub-DPB corresponds to one of a plurality of layer types. In that regard, video decoder 30 may be configured to determine the layer type by at least one of a spatial resolution, bit depth, or color format. The spatial resolution, bit depth, and/or color format may be indicated by the values of syntax elements received in the encoded video bitstream. The received syntax elements for spatial resolution, bit depth, and/or color format may be used to derive an index which identifies a particular sub-DPB that is configured to store the particular layer type determined by video decoder 30.

In one example of the disclosure, video encoder 20 is configured to generate at least one syntax element whose value indicates the size of the sub-DPBs in terms of the number of pictures a particular sub-DPB is allowed to store. That is, video encoder 20 generates at least one syntax element that indicates how many picture buffers are needed for each sub-DPB. In one example, the value of the syntax element may directly indicate the number of picture buffers.

In another example, the value of the syntax element may be an index to a look-up table that includes a plurality of entries whose values indicate the number of picture buffers. In other examples, video encoder 20 may generate a syntax element that indicates how much memory (e.g., in units of megabytes) is needed for each sub-DPB.

In a particular example of the disclosure, video encoder 20 is configured to generate at least one syntax element whose value indicates the size of the sub-DPBs, and signal the at least syntax element in the VPS. In one example of the disclosure, video encoder 20 may generate a respective syntax element for each sub-DPB for each operation point. In another example of the disclosure, video encoder 20 may generate one or more sub-DBP size syntax elements whose values are shared by one or more sub-DPBs.

Video encoder 20 may be further configured to generate at least one syntax element for inclusion in the VPS whose value indicates the number of supported sub-DPB sizes for each sub-DPB. That is, video encoder 20 may generate at least one syntax element that indicates the total number of different sub-DPB sizes for each sub-DPB, as well as one or more syntax elements that indicate what those sizes are. In this way, video encoder 20 may further include a syntax element for each operation point that serves as an index to a particular one of the sub-DPB sizes. Again, as described above, an operation point in a multi-layer video coding process indicates how many layers are to be decoded and output. That is, an operation point identifies a temporal subset (i.e., a set layers to be coded) to produce an output layer set (i.e., the picture to be output).

In another example of the disclosure, video encoder 20 may be configured to use prediction techniques for signaling syntax elements indicating sub-DPB sizes for each operation point. That is, for some VPSs, video encoder 20 may be configured to explicitly signal sub-DPBs sizes for each operation point. That is, the value of a syntax element directly and explicitly indicates a sub-DPB size. For other VPSs, rather than explicitly signaling a sub-DPB size, video encoder 20 may signal a syntax element that may be used to predict the sub-DPB size from a previously signaled sub-DPB size. As one example, video encoder 20 may signal a syntax element whose value represents a difference (i.e., a delta value) between a sub-DPB size to be used for pictures relating to a current VPS and a sub-DPB size signaled for a previous operation point in a previously signaled VPS. In this example, video decoder 30 may a derive sub-DPB size for a current VPS by adding the signaled delta value to a previously determined (whether by explicit signaling or predictive signaling) sub-DPB size.

In another example of the disclosure, video encoder 20 may be configured to signal a syntax element whose value indicates a number of sub-DPBs for each temporal subset of each layer set by using prediction signaling relative to a closest previous operation point. For example, video encoder 20 may generate and signal a syntax element indicating a sub-DPB size for an operation point (e.g., an operation point that includes one base layer and two enhancement layers) by signaling a difference between a sub-DPB size for the current operation point and the sub-DPB size for a previous operation point using a number of layers closest to that of the current operation point (in this example, three layers).

In another aspect of this example, video encoder 20 may be configured to arrange the number of sub-DPBs in an always increasing (or at least non-decreasing) manner compared to a previously signaled layer set for each layer set signaled in VPS. In this way, the number of sub-DPBs is also increasing for each operation point. As another example, video encoder 20 may be configured to use prediction signaling from a different operation point which is explicitly signaled for the current operation point.

In another example of the disclosure, video encoder 20 may be configured to generate and signal a syntax element whose value may indicate that the presence of operation points for certain layers (e.g., as indicated by the value of a TemporalID syntax element) is disabled. For example, video encoder 20 may be configured to generate and signal a flag indicating that sub-DBP size information is not present for a certain output layer set in the case that a highest temporalID of one layer in the output layer set is smaller than a certain value. As another example, video encoder 20 may be configured to signal a range of applicable temporal levels (e.g., TemporlID values) for which no sub-DPB sizes (or other operation point/layer set information) are signaled.

As discussed above, video decoder 30 may be configured to receive one or more of the syntax element generated and signaled by video encoder 20 that indicate a number of sub-DPBs and/or the sizes of sub-DPBs for each operation point. In one example, such syntax elements are signaled in a VPS.

Video decoder 30 may be configured to determine, whether through explicit signaling in the VPS or predictive signaling in the VPS, a number sub-DPBs needed for a particular operation point. Based on the determination of the number of sub-DPBs, video decoder 30 may be configured to partition a DPB into a plurality of sub-DPBs.

Likewise, video decoder 30 may be configured to determine, whether through explicit signaling in the VPS or predictive signaling in the VPS, sub-DPB sizes for each operation point. Based on the determined sub-DPB sizes, video decoder 30 may be configured to allocate memory space for one or more sub-DPBs.

Video decoder 30 may be further configured to independently maintain the fullness or the capacity of each sub-DPB. That is, video decoder 30 may be configured to implement a bumping process (i.e., picture removal process) from each sub-DPB based on the indicated size of the sub-DPB. Video decoder 30 may be configured to remove pictures from each sub-DPB such that the number of layer pictures needed for each operation point does not exceed the storage capacity of each sub-DPB.

Video encoder 20 and Video decoder 30 may also be configured to mark layer pictures as "unused for reference" or "used for reference" for each sub-DPB independently. That is, video encoder 20 and video decoder 30 may be configured to perform a marking process on the pictures in each of the plurality of sub-DPBs independently (i.e., a marking process is performed for each sub-DPB), wherein the marking process marks pictures as used for reference or marks the pictures as unused for reference.

However, video decoder 30 may be configured to output pictures and remove pictures based on the output times and order times, as indicated in HRD settings. The output and removal of pictures a may be performed across several sub-DPBs. In examples of this disclosure, pictures in different sub-DPBs may be output at the same time in the case that each sub-DPB is associated with the same output time in the HRD settings. Once output, a picture in a sub-DPB may be marked (e.g., by a syntax element) as "not needed for output." Likewise, pictures in different sub-DBPs may be removed from the sub-DPBs at the same time if they have been marked as both "unused for reference" and "not needed for output."

Figure 6:
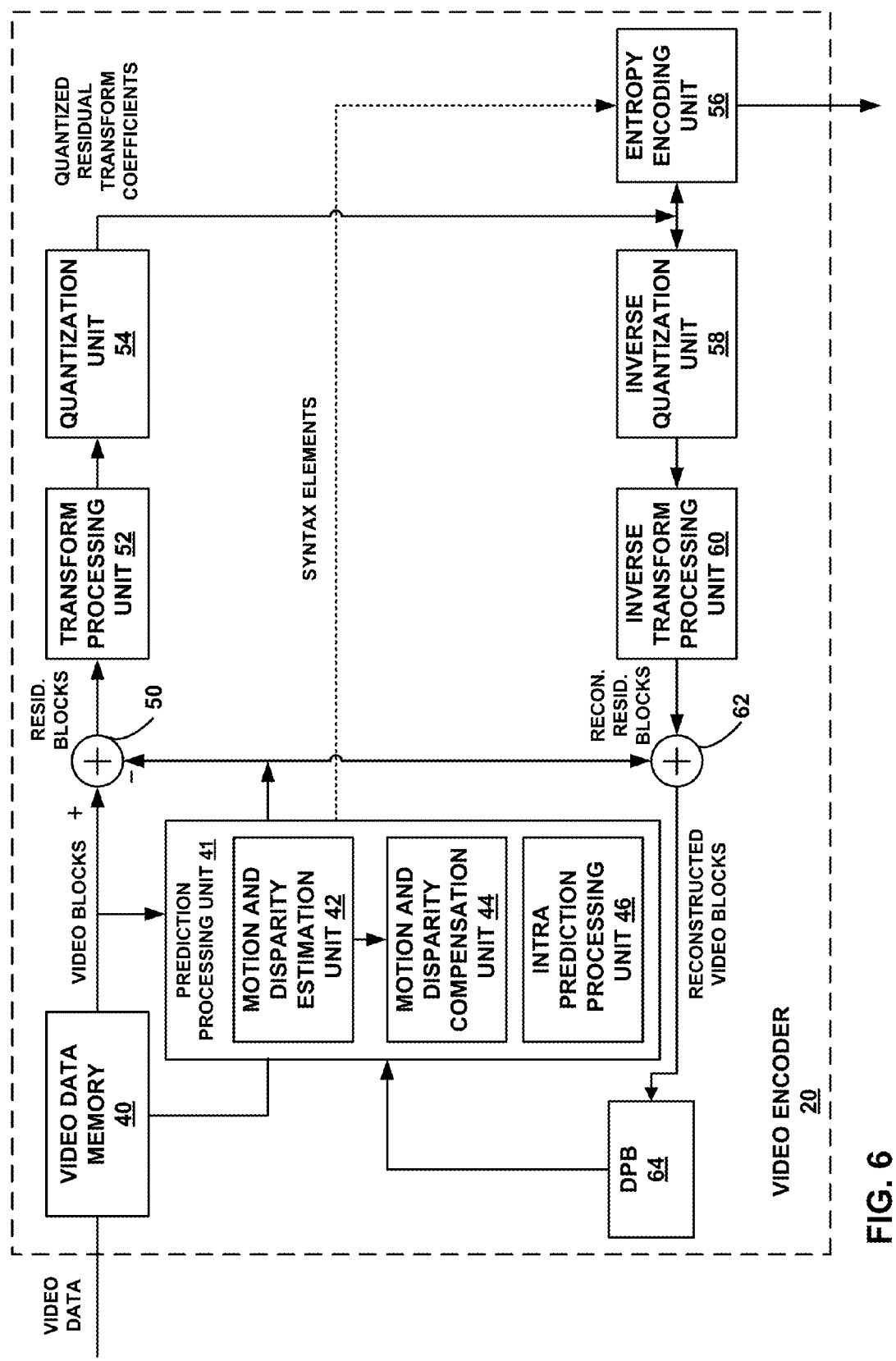
FIG. 6 is a block diagram illustrating an example video encoder that may implement the techniques described in this disclosure.

FIG. 6 is a block diagram illustrating an example video encoder 20 that may implement the techniques for DPB management described in this disclosure. Video encoder 20 may be configured to encode video data according to any video encoding techniques, including HEVC and H.264/AVC, as well as scalable, multiview and 3D extensions of such standards. The example of FIG. 6 will be explained with reference to HEVC. In this regard, the video encoding loop shown in FIG. 6 may be applied to each layer of a scalable video encoding process (i.e., base layers and enhancement layers), to each view of a multiview video coding process, or to both texture and depth views of a 3D video coding process.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes. In addition, video encoder 20 may perform inter-view prediction and/or inter-layer prediction between different views or layers, as described above.

In the example of FIG. 6, video encoder 20 includes video data memory 40, prediction processing unit 41, DPB 64, summer 50, transform processing unit 52, quantization unit 54, and entropy encoding unit 56. Prediction processing unit 41 includes motion and disparity estimation unit 42, motion and disparity compensation unit 44, and intra prediction processing unit 46. For video block reconstruction, video encoder 20 also includes inverse quantization unit 58, inverse transform processing unit 60, and summer 62. A deblocking filter (not shown in FIG. 6) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. DPB 64 is one example of a decoding picture buffer (DPB that stores reference video data for use in encoding video data by video encoder 20 (e.g., in intra- or inter-coding modes, also referred to as intra- or inter-prediction coding modes). Video data memory 40 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and DPB 64 may be provided by the same memory device or separate memory devices. In various examples, video data memory 40 may be on-chip with other components of video encoder 20, or off-chip relative to those components.

As shown in FIG. 6, video encoder 20 receives video data and may be configured to partition the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes or interview coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion and disparity estimation unit 42 and motion and disparity compensation unit 44 within prediction processing unit 41 perform inter-predictive coding and/or interview coding of the current video block relative to one or more predictive blocks in one or more reference pictures, reference picture layers, and/or reference views to provide temporal and interview prediction.

Motion and disparity estimation unit 42 may be configured to determine the inter-prediction mode and/or interview prediction mode for a video slice according to a predetermined pattern for a video sequence. The predetermined pattern may designate video slices in the sequence as P slices or B slices. Motion and disparity estimation unit 42 and motion and disparity compensation unit 44 may be highly integrated, but are illustrated separately for conceptual purposes. Motion estimation, performed by motion and disparity estimation unit 42, is the process of generating motion vectors, which estimate motion for video blocks. A motion vector, for example, may indicate the displacement of a PU of a video block within a current video frame or picture relative to a predictive block within a reference picture. Disparity estimation, performed by motion and disparity estimation unit 42, is the process of generating disparity vectors, which may be used to predict a currently coded block from a block in a different view.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion and disparity estimation unit 42 calculates a motion vector (for motion compensated prediction) and/or a disparity vector (for disparity compensated prediction) for a PU of a video block in an inter-coded or interview predicted slice by comparing the position of the PU to the position of a predictive block of a reference picture. The reference picture may be selected from a first reference picture list (List 0) or a second reference picture list (List 1), each of which identify one or more reference pictures stored in DPB 64. For interview prediction, the reference picture is in a different view. Motion and disparity estimation unit 42 sends the calculated motion vector and/or disparity vector to entropy encoding unit 56 and motion and disparity compensation unit 44.

Motion compensation and/or disparity compensation, performed by motion and disparity compensation unit 44, may involve fetching or generating the predictive block based on the motion vector determined by motion estimation and/or disparity estimation, possibly performing interpolations to sub-pixel precision. Upon receiving the motion vector and/or disparity for the PU of the current video block, motion and disparity compensation unit 44 may locate the predictive block to which the motion vector and/or disparity vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion and disparity estimation unit 42 and motion and disparity compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or a mode select unit, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. This part of video encoder 20 is sometimes called the reconstruction loop, and effectively decodes an encoded video block for use as a reference picture in inter-prediction. The reconstructed pictures and/or reconstructed layer pictures are stored in DPB 64.

Motion and disparity compensation unit 44 may calculate a reference block by adding the residual block to a predictive block of one of the reference pictures within one of the reference picture lists. Motion and disparity compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in DPB 64. The reference block may be used by motion and disparity estimation unit 42 and motion and disparity compensation unit 44 as a reference block to inter-predict a block in a subsequent video frame or picture.

As discussed above with reference to FIG. 5, DPB 64 may be partitioned into a plurality of sub-DPBs, where each sub-DPB is configured to store pictures for a different type of layer in a multi-layer video coding process. As was discussed above, and will be discussed in more detail below with reference to FIG. 8, video encoder 20 may be configured to perform the DPB management techniques of this disclosure that include generating a syntax element indicating a sub-DPB size for each operation point of a multi-layer video coding process.

Figure 7:
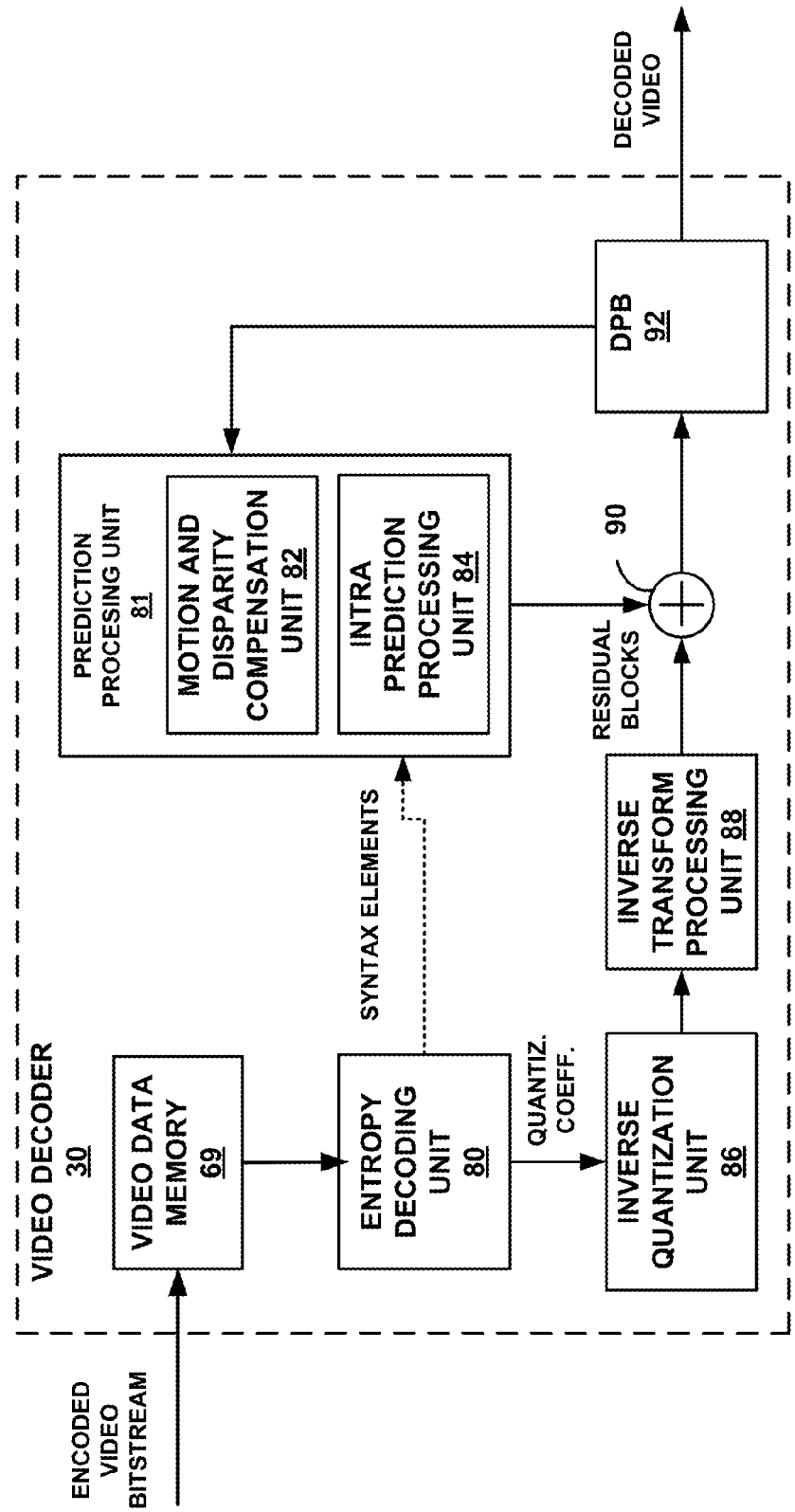
FIG. 7 is a block diagram illustrating an example video decoder that may implement the techniques described in this disclosure.

FIG. 7 is a block diagram illustrating an example video decoder 30 that may implement the DPB management techniques described in this disclosure. In the example of FIG. 7, video decoder 30 includes video data memory 69, entropy decoding unit 80, prediction processing unit 81, inverse quantization unit 86, inverse transformation processing unit 88, summer 90, and DPB 92. Prediction processing unit 81 includes motion and disparity compensation unit 82 and intra-prediction processing unit 84. Video decoder 30 may, in some examples, perform a decoding pass generally reciprocal to the encoding pass described with respect to video encoder 20 from FIG. 6.

Video data memory 69 may store video data, such as an encoded video bitstream, to be decoded by the components of video decoder 30. The video data stored in video data memory 69 may be obtained, for example, from storage device 34, from a local video source, such as a camera, via wired or wireless network communication of video data, or by accessing physical data storage media. Video data memory 69 may form a coded picture buffer (CPB) that stores encoded video data from an encoded video bitstream.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, disparity vectors, and other syntax elements. Entropy decoding unit 80 forwards the motion vectors, disparity vectors, and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, or P) slice or interview predicted slice, motion and disparity compensation unit 82 of prediction processing unit 81 produces predictive blocks for a video block of the current video slice based on the motion vectors, disparity vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 92.

Motion and disparity compensation unit 82 determines prediction information for a video block of the current video slice by parsing the motion vectors and other syntax elements, and uses the prediction information to produce the predictive blocks for the current video block being decoded. For example, motion and disparity compensation unit 82 uses some of the received syntax elements to determine a prediction mode (e.g., intra- or inter-prediction) used to code the video blocks of the video slice, an inter-prediction or interview prediction slice type (e.g., B slice or P slice), construction information for one or more of the reference picture lists for the slice, motion vectors and/or disparity vectors for each inter-encoded video block of the slice, inter-prediction status for each inter-coded video block of the slice, and other information to decode the video blocks in the current video slice.

Motion and disparity compensation unit 82 may also perform interpolation based on interpolation filters. Motion and disparity compensation unit 82 may use interpolation filters as used by video encoder 20 during encoding of the video blocks to calculate interpolated values for sub-integer pixels of reference blocks. In this case, motion and disparity compensation unit 82 may determine the interpolation filters used by video encoder 20 from the received syntax elements and use the interpolation filters to produce predictive blocks.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion and disparity compensation unit 82 generates the predictive block for the current video block based on the motion vectors and/or disparity vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality.

The decoded video in a given frame or picture are then stored in DPB 92, which stores reference pictures blocks (or layer pictures in a multi-layer video coding process) used for subsequent motion compensation. DPB 92 also stores decoded video for presentation on a display device, such as display device 32 of FIG. 1.

As discussed above with reference to FIG. 5, DPB 92 may be partitioned into a plurality of sub-DPBs, where each sub-DPB is configured to store pictures for a different type of layer in a multi-layer video coding process. As was discussed above, and will be discussed in more detail below with reference to FIG. 9, video decoder 300 may be configured to perform the DPB management techniques of this disclosure that include receiving a syntax element indicating a sub-DPB size for each operation point of a multi-layer video coding process, and allocating memory space for the sub-DBPs based on the received indication.

Figure 8:
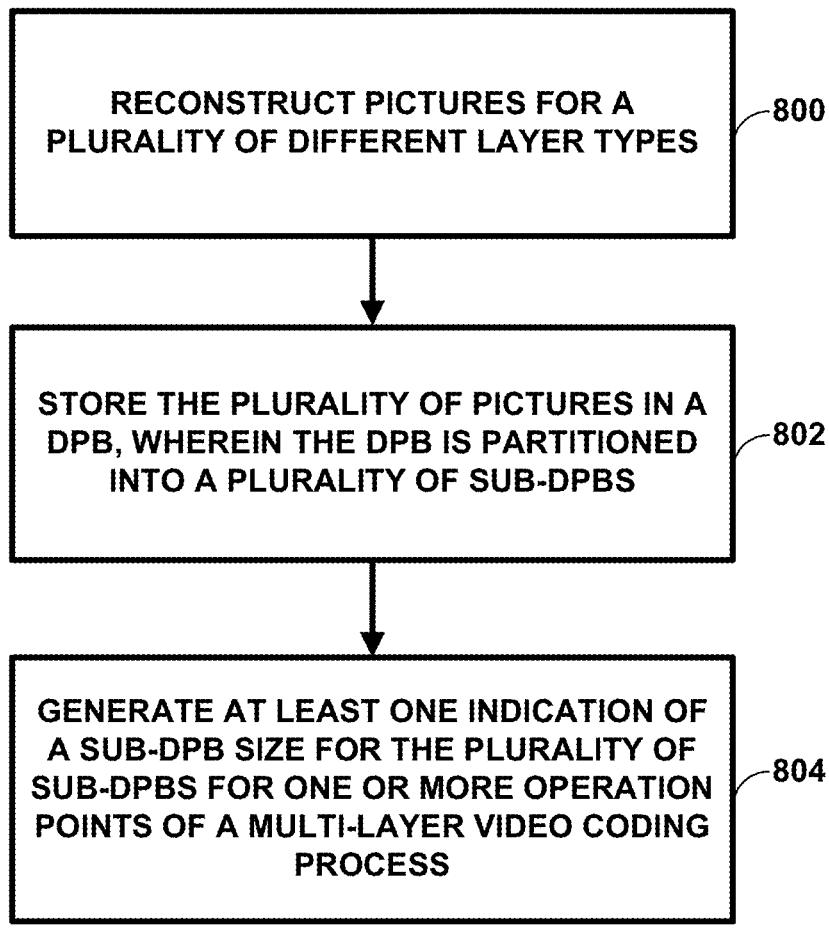
FIG. 8 is a flowchart showing an example encoding method according to the techniques of this disclosure.

FIG. 8 is a flowchart showing an example encoding method according to the techniques of this disclosure. The techniques of FIG. 8 may be executed by one or more functional units of video encoder 20, including, e.g., DPB 64.

In one example of the disclosure, video encoder 20 is configured to reconstruct a plurality of pictures of a plurality of different layer types (800), store the plurality of pictures in a DPB, wherein the DPB is partitioned into a plurality of sub-DPBs (802), and generate at least one indication of a sub-DPB size for the plurality of sub-DPBs for one or more operation points of a multi-layer video coding process (804). In one example of the disclosure, the multi-layer video coding process is one of a multi-view video coding process or a scalable video coding process.

In another example of the disclosure, each of the plurality of sub-DPBs is configured to store pictures for one layer type in the multi-layer video coding process. In this example, video encoder 20 may be further configured to store pictures for each of the plurality of layers in a particular sub-DPB according to the layer type of the respective picture.

In another example of the disclosure, video encoder 20 is configured to generate the at least one indication of the sub-DPB size in a video parameter set (VPS). In one example, the at least one indication is a syntax element having a value that explicitly indicates the sub-DPB size, and the sub-DPB size is a number of pictures. In another example of the disclosure, the at least one indication is a syntax element having a value that represents a difference between a sub-DPB size for the one or more operations points and a sub-DPB size for a previously signaled operation point.

In another example of the disclosure, video encoder 20 is configured to generate a respective indication of the sub-DPB size for each of the plurality of sub-DPBs for one or more operation points of the multi-layer video coding process.

Figure 9:
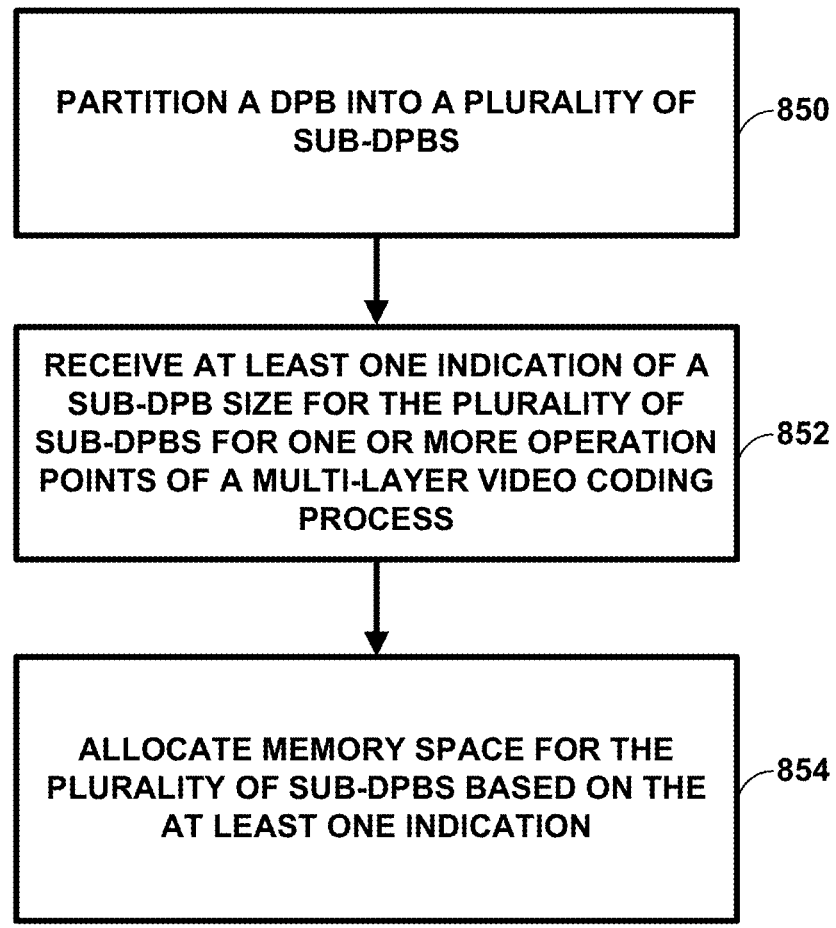
FIG. 9 is a flowchart showing an example decoding method according to the techniques of this disclosure.

FIG. 9 is a flowchart showing an example decoding method according to the techniques of this disclosure. The techniques of FIG. 9 may be executed by one or more functional units of video decoder 30, including, e.g., DPB 92.

In one example of the disclosure, video decoder 30 is configured to partition a DPB into a plurality of sub-DPBs (850), receive at least one indication of a sub-DPB size for the plurality of sub-DPBs for one or more operation points of a multi-layer video coding process (852), and allocate memory space for the plurality of sub-DPBs based on the at least one indication (854). In one example of the disclosure, the multi-layer video coding process is one of a multi-view video coding process or a scalable video coding process.

In another example of the disclosure, each of the plurality of sub-DPBs is configured to store pictures for one layer type in the multi-layer video coding process. In this example, video decoder 30 may be further configured to store pictures for each of the plurality of layers in a particular sub-DPB according to the layer type of the respective picture.

In another example of the disclosure, video decoder 30 is further configured to output the pictures stored in the plurality of sub-DPBs according to an output time, wherein pictures in sub-DPBs having the same output time are output at the same time, perform a marking process on the pictures in each of the plurality of sub-DPBs independently, wherein the marking process marks pictures as used for reference or marks the pictures as unused for reference, and remove pictures from the plurality of sub-DPBs that are no longer needed for output and have been marked as unused for reference.

In another example of the disclosure, video decoder 30 is further configured to determine the layer type by at least one of a spatial resolution, bit depth, or color format.

In another example of the disclosure, video decoder 30 is further configured to decode a plurality of pictures, store the plurality of pictures in the plurality of sub-DPBs, and output one or more pictures to a display.

In another example of the disclosure, video decoder 30 is further configured to receive the at least one indication of the sub-DPB size in a video parameter set. In one example, the at least one indication is a syntax element having a value that explicitly indicates the sub-DPB size, wherein the sub-DPB size is a number of pictures. In another example, the at least one indication is a syntax element having a value that represents a difference between a sub-DPB size for the one or more operations points and a sub-DPB size for a previously signaled operation point.

In another example of the disclosure, video decoder 30 is further configured to receive a respective indication of the sub-DPB size for each of the plurality of sub-DPBs for one or more operation points of the multi-layer video coding process.

In another example of the disclosure, video decoder 30 is further configured to receive an indication of a number of sub-DPBs, wherein partitioning the DPB into a plurality of sub-DPBs comprises partitioning the DPB into a plurality of sub-DPBs based on the indication of the number of sub- DPBs. Video decoder 30 may be further configured to derive an index identifying each of the plurality of sub-DPBs according to a layer type.

The following sections show example implementations of the techniques of this disclosure in terms of additions to and deletions from the HEVC standard (e.g., HEVC version 1, SHEVC, and/or MV-HEVC). Additions to the HEVC specification are shown in underline, while deletions from the HEVC specification are shown with a strikethrough. The semantics of syntax elements not expressly discussed below may be found in the example HEVC, SHVC, and/or MV-HEVC specifications cited above.

The first section shows VPS extension syntax that includes the addition of DPB sizes for each operation point, as indicated by the max_dpb_size_table. Semantic definitions for the syntax elements contained max_dpb_size_table are shown below. In this example, the max_dpb_size_table includes syntax elements that indicate the maximum number of sub-DPBs for all output layer sets indicated in the VPS (num_sub_dpb_capcity_minus1), the number of sub-DPB sizes signaled (num_sub_dpb_size_minus1), and the size of each sub-DPB as a difference value (delta_sub_dpb_size_minus 1).

TABLE 3

Video parameter set extension syntax

| vps_extension( ) { | Descriptor |
|---|---|
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 0; i <= vps_max_layers_minus1; i++ ) { | |
|     if( vps_nuh_layer_id_present_flag && i > 0 ) | |
| [Ed. (JB): syntax is not compatible with SHVC, or use of splitting_flag.] | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   for( i = 1; i <= vps_max_layers_minus1; i++ ) | |
|     for( j = 0; j < i; j++ ) | |
|       direct_dependency_flag[ i ][ j ] | u(1) |
|   for( i = 0; i< vps_max_layers_minus1; i++ ) | |
|     max_tid_il_ref_pics_plus1[ i ] | u(3) |
|   vps_number_layer_sets_minus1 | u(10) |
|   vps_num_profile_tier_level_minus1 | u(6) |
|   ... | |
|   for( i = 1; i <= vps_num_profile_tier_level_minus1; i ++ ) { | |
|     vps_profile_present_flag[ i ] | u(1) |
|     if( !vps_profile_present_flag[ i ] ) | |
|       profile_ref_minus1[ i ] | u(6) |
|     profile_tier_level( vps_profile_present_flag[ i ], vps_max_sub_layers_minus1 ) | |
|   } | |
|   NumOutputLayerSets = vps_number_layer_sets_minus1 + 1 | |
|   more_output_layer_sets_than_default_flag | u(1) |
|   if( more_output_layer_sets_than_default_flag ) { | |
|     num_add_output_layer_sets_minus1 | u(10) |
|     NumOutputLayerSets += num_add_output_layer_sets_minus1 + 1 | |
|   } | |

TABLE 3-continued

Video parameter set extension syntax

| vps_extension( ) { | Descriptor |
|---|---|
|   if(NumOutputLayerSets > 1 ) | |
|     default_one_target_output_layer_flag | u(1) |
|   for( i = 1; i < NumOutputLayerSets; i++ ) { | |
|     if( i > vps_number_layer_sets_minus1 ) { | |
|       output_layer_set_idx_minus1[ i ] | u(v) |
|       lsIdx = output_layer_set_idx_minus1[ i ] + 1 | |
|       for( j = 0 ; j < NumLayersInIdList[ lsIdx ] − 1; j++) | |
|         output_layer_flag[ i ][ j ] | u(1) |
|     } | |
|     profile_level_tier_idx[ i ] | u(v) |
|   } | |
|   max_one_active_ref_layer_flag | u(1) |
|   max_dpb_sizes_table() | |
|   direct_dep_type_len_minus2 | ue(v) |
|   for( i = 1; i <= vps_max_layers_minus1; i++) | |
|     for( j = 0; j < i; j++ ) | |
|       if( direct_dependency_flag[ i ][ j ] ) | |
|         direct_dependency_type[ i ][ j ] | u(v) |
|   vps_shvc_reserved_zero_flag | u(1) |
| } | |

TABLE 4

DPB Size Table Syntax

| max_dpb_sizes_table( ) { | |
|---|---|
|   num_sub_dpb_capacities_minus1 | ue(v) |
|   for( i = 0; i <= num_sub_dpb_capacities_minus1; i++) { | |
|     num_sub_dpb_size_minus1 [ i ] | ue(v) |
|     for( j= 0; j <= num_sub_dpb_size_minus1[ i]; j++) | |
|       delta_sub_dpb_size_minus1[ i ][ j ] | ue(v) |
|   } | |
|   for( i = 1, subDpbInfoFlag = 1; i <= vps_number_layer_sets_minus1; i++ ) | |
|     for( k = vps_max_sub_layers_minus1; ( k>= 0) && subDpbInfoFlag; k−− ) { | |
|       sub_dpb_info_present_flag[ i ][ k ] | u(1) |
|       subDpbInfoFlag = sub_dpb_info_present_flag[ i ][ k ] | |
|       if( num_sub_dpb_capacities_minus1 > 0) { | |
|         same_num_sub_dpbs_flag[ i ][ k ] | u(1) |
|         if( !same_num_sub_dpbs_flag[ i ][ k ] ) | |
|           delta_num_sub_dpbs_minus1[ i ][ k ] | ue(v) |
|       } | |
|     } | |
|   for( i = 1; i < NumOutputLayerSets; i++) | |
|     for( k = vps_max_sub_layers_minus1; k >= 0; k++) | |
|       if( SubDpbInfoPresentFlag[ output_layer_set_idx_minus1[ i] ][k ]) | u(1) |
|         for( j = 0; j < NumSubDPBs[ output_layer_set_idx_minus1[ i ] + 1 ][ k ]; j++) { | |
|           if( num_sub_dpb_capacities_minus1 > 0 ) | |
|             sub_dpb_capacity_idx[ i ][ k ][ j ] | u(v) |
|           sub_dpb_size_idx[ i ][ k ][ j ] | u(v) |
|         } | |
|   } | |
| } | |

DPB Size Table Semantics num_sub_dpb_capacity_minus1 plus 1 specifies the maximum number of sub-DPBs for all the output layer sets indicated in this VPS. Each sub-DPB has the same capacity in terms of the overall characteristics of each unit of the decoded picture buffer.

Note: For example, all pictures that have the same resolution belong to the same sub-DPB, and different operation points may contain different number of pictures in a sub- DPB due to the difference in the number of layers with the same resolution in different operation points.

num_sub_dpb_size_minus1[i] plus 1 specifies the number of sizes signaled for the i-th sub-DPB signaled in the video parameter set.

delta_sub_dpb_size_minus1[i][j] plus 1 specifies the j-th size of the i-th sub-DPB signaled in the video parameter set. The j-th size of the i-th sub-DPB, denoted by subDpbSize[i][j], is derived as follows for j from 0 through num_sub_dpb_size_minus1[i].

subDpbSize[i][j]=delta_sub_dpb_size_minus1[i][j]+1+ (j>0 ? subDpbSize[i][j−1]:0).

sub_dpb_info_present_flag[i][k] equal to 1 indicates that the information for the k-th temporal subset of the i-th layer set is present, sub_dpb_info_present_flag[i][k] equal to 0 indicates that the information for the k-th temporal subset of the i-th layer set is not present. When not present, sub_dpb_info_present_flag[i][k] is inferred to be equal to 0.

same_num_sub_dpbs_flag[i][k] equal to 1 specifies that the number of sub-DPBs for k-th temporal subset of the i-th output layer set is equal to the number of sub-DPBs for the k-th temporal subset of the (i−1)-th output layer set. same_num_sub_dpbs_flag[i][k] equal to 0 specifies that the number of sub-DPBs for k-th temporal subset of the i-th output layer set is not equal to the number of sub-DPBs for the k-th temporal subset of the (i−1)-th output layer set. When not present same_num_sub_dpbs_flag[i][k] is inferred to be equal to 0.

delta_num_sub_dpbs_minus1[i][k] specifies the number of the sub-DPBs for the k-th temporal subset of the i-th output layer set.

The number of sub-DPBs for the i-th layer set and the k-th temporal subset, NumSubDpbs[i][k], is derived as follows:
      If sub_dpb_info_present_flag[i][k] is equal to 0, NumSubDpbs[i][k] is set to be equal to 0.
      Otherwise if sub_dpb_info_present_flag[i][k] is equal to 1 and num_sub_dpb_capacity_minus1 is equal to 0, NumSubDpbs[i][k] is set to be equal to 1.
      Otherwise (neither sub_dpb_info_present_flag[i][k] nor num_sub_dpb_capacity_minus1 is equal to 0), NumSubDpbs[i][k] is derived as follows:
      NumSubDpbs[i][k]=(!same_num_sub_dpbs_flag[i][k])? (delta_num_sub_dpbs_minus1[i][k]+1+NumSubDPBs[i−1][k])
      NumSubDPBs[i−1][k].

The variable NumSubDpbsInOptLayerSet[i][k] for the i-th output layer set and the k-th temporal subset is derived as follows:

NumSubDpbsInOptLayerSet[i][k]=NumSubDpbs[output_layer_set_idx_minus1[i]][k]

The variable SubDpbInfoPresentFlag[i][k] for the i-th output layer set and the k-th temporal subset is derived as follows:

SubDpbInfoPresentFlag[i][k]=sub_dpb_info_present_flag[output_layer_set_idx_minus1[i]][k]

sub_dpb_capacity_idx[i][k][j] specifies the index to the sub-DPBs. The j-th sub-DPB of the k-th temporal subset of the i-th output layer set is the sub_dpb_capacity_idx[j]-th sub-DPB signaled with sub_dpb_capacity_idx. sub_dpb_capacity_idx[i][k][j] is in the range of 0 to num_sub_dpb_capacity_minus1, inclusive. When not present, sub_dpb_capacity_idx[i][k][j] is inferred to be equal to 0.

sub_dpb_size_idx[i][k][j] specifies the index to the sizes of the sub_dpb_capacity_idx[i][k][j]-th sub-DPB. sub_dpb_size_idx[i][k][j] is in the range of 0 to num_sub_dpb_size_minus1[sub_dpb_capacity_idx[j]], inclusive. VpsSubDpbMaxDecPicBuf[i][k][j] is equal to subDpbSize[sub_dpb_capacity_idx[i][k][j]][sub_dpb_size_idx[i][k][j]].

VpsSubDpbMaxDecPicBuf[i][k][j] specifies the maximum required size of the j-th sub-DPB for the CVS for the i-th output layer set in units of picture storage buffer when HighestTId equal to k. When k is greater than 0, VpsSubDpbMaxDecPicBuf[i][k][j] shall be greater than or equal to VpsSubDpbMaxDecPicBuf[i][k][j−1].

8.1 General Decoding Process

Input to this process is a bitstream. Output of this process is a list of decoded pictures.

The variable OutputLayerSetIdx, which specifies the index to the list of the output layer sets specified by the VPS, of the target output layer set, is specified as follows:

If some external means, not specified in this Specification, is available to set OutputLayerSetIdx, OutputLayerSetIdx is set by the external means.
    Otherwise, if the decoding process is invoked in a bitstream conformance test as specified in subclause C.1, OutputLayerSetIdx is set as specified in subclause C.1.
    Otherwise, OutputLayerSetIdx is set equal to 0.

The variable DecLayerSetIdx is set equal to output_layer_set_idx_minus1[OutputLayerSetIdx]+1.

The layer identifier list TargetOptLayerIdList, which specifies the list of nuh_layer_id values, in increasing order of nuh_layer_id values, of the pictures to be output, and the layer identifier list TargetDecLayerIdList, which specifies the list of nuh_layer_id values, in increasing order of nuh_layer_id values, of the NAL units to be decoded, is specified as follows:

```
lsIdx = DecLayerSetIdx
for( k = 0, j = 0; j < NumLayersInIdList[ lsIdx ];j++) {
    TargetDecLayerIdList[ j ] = LayerSetLayerIdList[ lsIdx ][ j ]
                                                                    (8-1)
    if( output_layer_flag[ lsIdx ][ j ] )
        TargetOptLayerIdList[ k++ ] = LayerSetLayerIdList[ lsIdx ][ j ]
}
```

The variable HighestTid, which identifies the highest temporal sub-layer to be decoded, is specified as follows:
. . . .

8.1.1 Decoding Process for a Coded Picture with nuh_layer_id Equal to 0

When the current picture is a BLA picture that has nal_unit_type equal to BLA_W_LP or is a CRA picture, the following applies:

If some external means not specified in this Specification is available to set the variable UseAltCpbParamsFlag to a value, UseAltCpbParamsFlag is set equal to the value provided by the external means.
    Otherwise, the value of UseAltCpbParamsFlag is set equal to 0.

Depending on the value of separate_colour_plane_flag, the decoding process is structured as follows:

If separate_colour_plane_flag is equal to 0, the decoding process is invoked a single time with the current picture being the output.
    Otherwise (separate_colour_plane_flag is equal to 1), the decoding process is invoked three times. Inputs to the decoding process are all NAL units of the coded picture with identical value of colour_plane_id. The decoding process of NAL units with a particular value of colour_plane_id is specified as if only a CVS with monochrome colour format with that particular value of colour_plane_id would be present in the bitstream. The output of each of the three decoding processes is assigned to one of the 3 sample arrays of the current picture, with the NAL units with colour_plane_id equal to 0, 1, and 2 being assigned to $S_L$, $S_{Cb}$, and $S_{Cr}$, respectively.

NOTE—The variable ChromaArrayType is derived as equal to 0 when separate_colour_plane_flag is equal to 1 and chroma_format_idc is equal to 3. In the decoding process, the value of this variable is evaluated resulting in operations identical to that of monochrome pictures (when chroma_format_idc is equal to 0).

The decoding process operates as follows for the current picture CurrPic:

1. The decoding of NAL units is specified in subclause 8.2.
2. The processes in subclause 8.3 specify the following decoding processes using syntax elements in the slice segment layer and above:

Variables and functions relating to picture order count are derived in subclause 8.3.1. This needs to be invoked only for the first slice segment of a picture.

The decoding process for RPS in subclause 8.3.2 is invoked, wherein reference pictures may be marked as "unused for reference" or "used for long-term reference". This needs to be invoked only for the first slice segment of a picture.

When the current picture is a BLA picture or is a CRA picture with NoRaslOutputFlag equal to 1, the decoding process for generating unavailable reference pictures specified in subclause 8.3.3 is invoked, which needs to be invoked only for the first slice segment of a picture.

PicOutputFlag is set as follows:

If the current picture is a RASL picture and NoRaslOutputFlag of the associated IRAP picture is equal to 1, PicOutputFlag is set equal to 0.

Otherwise if nuh_layer_id equal to 0 is not present in TargetOptLayerIdList, PicOutputFlag is set equal to 0.

Otherwise, PicOutputFlag is set equal to pic_output_flag.

At the beginning of the decoding process for each P or B slice, the decoding process for reference picture lists construction specified in subclause 8.3.4 is invoked for derivation of reference picture list 0 (RefPicList0) and, when decoding a B slice, reference picture list 1 (RefPicList1).

3. The processes in subclauses 8.4, 8.5, 8.6, and 8.7 specify decoding processes using syntax elements in all syntax structure layers. It is a requirement of bitstream conformance that the coded slices of the picture shall contain slice segment data for every coding tree unit of the picture, such that the division of the picture into slices, the division of the slices into slice segments, and the division of the slice segments into coding tree units each form a partitioning of the picture.

4. After all slices of the current picture have been decoded, the decoded picture is marked as "used for short-term reference".

F.3 Definitions
. . . .

F.3.16 Operation Point:

A bitstream that is created from another bitstream by operation of the sub-bitstream extraction process with the another bitstream, a target highest TemporalId, and a target layer identifier list as inputs, and that is associated with a set of target output layers.

NOTE 14—If the target highest TemporalId of an operation point is equal to the greatest value of TemporalId in the layer set associated with the target layer identification list, the operation point is identical to the layer set. Otherwise it is a subset of the layer set.

F.3.17 Output Layer Set:

A layer set that is associated with a set of target output layers.

F.8.1.2 Decoding Process for Ending the Decoding of a Coded Picture with nuh_layer_id Greater than 0

PicOutputFlag is set as follows:

If the current picture is a RASL picture and NoRaslOutputFlag of the associated IRAP picture is equal to 1, PicOutputFlag is set equal to 0.

Otherwise if nuh_layer_id is not present in TargetOptLayerIdList, PicOutputFlag is set equal to 0.

Otherwise, PicOutputFlag is set equal to pic_output_flag.

The following applies:

If discardable_flag is equal to 1, the decoded picture is marked as "unused for reference".

Otherwise, the decoded picture is marked as "used for short-term reference".

When TemporalId is equal to HighestTid, the marking process for sub-layer non-reference pictures not needed for inter-layer prediction specified in subclause F.8.1.2.1 is invoked with latestDecLayerId equal to nuh_layer_id as input.

F.13 Hypothetical Reference Decoder

F.13.1 General

The specifications in subclause C.1 apply with the following modifications and additions.

Replace "An operation point under test, denoted as TargetOp, is selected. The layer identifier list OpLayerIdList of TargetOp consists of the list of nuh_layer_id values, in increasing order of nuh_layer_id values, present in the bitstream subset associated with TargetOp, which is a subset of the nuh_layer_id values present in the bitstream under test. The OpTid of TargetOp is equal to the highest TemporalId present in the bitstream subset associated with TargetOp." with "A target output layer set, identified by OutputLayerSetIdx, and a target highest TemporalId value, HighestTid, are selected. The value of OutputLayerSetIdx shall be in the range of 0 to NumOutputLayerSets−1, inclusive. The value of HighestTid shall be in the range of 0 to vps_max_sub_layers_minus1, inclusive. TargetOptLayerIdList and TargetDecLayerIdList are then derived as specified in Equation 8-1. The operation point under test has OptLayerIdList equal to TargetOptLayerIdList, OpLayerIdList equal to TargetDecLayerIdList, and OpTid equal to HighestTid."

Replace "TargetDecLayerIdList is set equal to OpLayerIdList of TargetOp, HighestTid is set equal to OpTid of TargetOp, and the sub-bitstream extraction process as specified in clause 10 is invoked with the bitstream under test, HighestTid, and TargetDecLayerIdList as inputs, and the output is assigned to BitstreamToDecode." with "The sub-bitstream extraction process as specified in clause 10 is invoked with the bitstream under test, HighestTid, and TargetDecLayerIdList as inputs, and the output is assigned to BitstreamToDecode."

For each layer, the assignment of a sub-DPB to each layer is derived in the following process:

Set numTargetDecLayerIdList to be equal to numLayersInIdList[DecLayerSetIdx]. For i from 0 to numTarget- DecLayerIdList−1, inclusive, the arrays spatRes, colourFormat, and bitDepthId are defined as follows:
  spatRes[i][0] and spatRes[i][1] are set equal to the values of pic_width_in_luma_samples and pic_height_in_luma_samples respectively, of the active layer SPS of the i-th layer in the target layer set.
  colourFormat[i] is set equal to the value of chroma_format_idc[i] the active layer SPS of the i-th layer in the target layer set.
  bitDepthId[i][0] and bitDepthId[i][1] are set equal to the values of bit_depth_luma_minus8 and bit_depth_chroma_minus8, respectively, of the active layer SPS of the i-th layer in the target layer set.
The following applies:

```
subDpbCtr = 0
for( i = 0; i < numTargetDecLayerIdList; i++ )
    SubDpbAssigned[ k ][ i ] = − 1
for( i = 0; i < numTargetDecLayerIdList; i++ ) {
    if( SubDpbAssigned[ k ][ i ] < 0 ) {
            for( j = i + 1; j < numTargetDecLayerIdList; j++ )
                if( SubDpbAssigned[ k ][ j ] < 0 )
                    if( ( spatRes[ i ][ 0 ] = = spatRes[ j ][ 0 ] )
                        && ( spatRes[ i ][ 1 ] = = spatRes[ j ][ 1 ] )
                        && (bitDepthId [ i ][ 0 ] = = bitDepthId
                        [ j ][ 0 ] )
                        && (bitDepthId [ i ][ 1 ] = = bitDepthId
                        [ j ][ 1 ] )
                        && (colourFormat [ i ][ 0 ] = =
                        colourFormat
[ j ][ 0 ] ) )
                                   SubDpbAssigned[ k ][ j ] = subDpbCtr
    }
    subDpbCtr + +
}
```

For each picture with layer ID nuh_layer_id, the sub-DPB with index SubDpbAssigned[DecLayerSetIdx][LayerIdInVps[nuh_layer_id]] is said to be associated with that picture and also to be associated with that layer.

F.13.3 Operation of the Decoded Picture Buffer (DPB)
F.13.3.1 General

The specifications in this subclause apply independently to each set of DPB parameters selected as specified in subclause C.1.

The decoded picture buffer is partitioned into sub-DPBs, and each sub-DPB contains picture storage buffers. Each of the picture storage buffers may contain a decoded picture that is marked as "used for reference" or is held for future output. The number of sub-DPBs is equal to NumSubDpbs[TargetDecLayerId], and the number of picture storage buffers in each sub-DPB, as in the array of VpsSubDpbMaxDecPicBuf, is inferred from the active VPS. The processes specified in subclauses F.13.3.2, F.13.3.3 and F.13.3.4 are sequentially applied as specified below.

PicOutputFlag for pictures that are not included in a target output layer is set equal to 0.

Decoded pictures with the same DPB output time and with PicOutputFlag equal to 1 are output in ascending order of nuh_layer_id values of these decoded pictures.

Let picture n be the coded picture or decoded picture of the access unit n for a particular value of nuh_layer_id, wherein n is a non-negative integer number.

F.13.3.2 Removal of Pictures from the DPB

The specifications in subclause C.3.2 apply separately for each set of decoded pictures with a particular value of nuh_layer_id with the following modifications:

Replace "The removal of pictures from the DPB before decoding of the current picture (but after parsing the slice header of the first slice of the current picture) happens instantaneously at the CPB removal time of the first decoding unit of access unit n (containing the current picture) and proceeds as follows:" with "The removal of pictures from the DPB before decoding of the current picture (but after parsing the slice header of the first slice of the current picture) happens instantaneously at the CPB removal time of the first decoding unit of the picture n and proceeds as follows:".

Replace " . . . and the DPB fullness is set equal to 0." with "and the sub-DPB fullness is set equal to 0 for all the sub-DPBs."

Replace " . . . derived from the SPS active for the preceding picture . . . " with " . . . derived from the SPS active for the preceding picture in decoding order with the same nuh_layer_id value as the current picture, . . . "

Replace "For each picture that is removed from the DPB, the DPB fullness is decremented by one." by "For each picture that is removed from a sub-DPB, the sub-DPB fullness is decremented by one."

F.14.3 Bitstream Conformance

A bitstream of coded data conforming to this Specification shall fulfil all requirements specified in this subclause.

The bitstream shall be constructed according to the syntax, semantics, and constraints specified in this Specification outside of this annex.

The first access unit in a bitstream shall be an IRAP access unit, i.e. an IDR access unit, a CRA access unit or a BLA access unit.

The bitstream is tested by the HRD for conformance as specified in subclause C.1.

Let the nuh_layer_id of the current picture be currPicLayerId.

The variable AssociatedSubDpbSize[layerId][HighestTid] is set equal to VpsSubDpbMaxDecPicBuf[TargetOutputLayerId][HighestTid][subDpbId] where subDpbId is equal to SubDpbAssigned[TargetOutput LayerId][LayerIdInList[layerId]] for each layerId in TargetDecLayerIdList.

. . . .

All of the following conditions shall be fulfilled for each of the bitstream conformance tests:

1. For each access unit n, with n greater than 0, associated with a buffering period SEI message, let the variable deltaTime90k[n] be specified as follows:

$$\text{deltaTime90}k[n] = 90000 * (\text{AuNominalRemovalTime}[n] - \text{AuFinalArrivalTime}[n-1]) \quad (F\text{-}5)$$

The value of InitCpbRemovalDelay[SchedSelIdx] is constrained as follows:
  If cbr_flag[SchedSelIdx] is equal to 0, the following condition shall be true:

$$\text{InitCpbRemovalDelay}[\text{SchedSelIdx}] \leq \text{Ceil}(\text{deltaTime90}k[n]) \quad (F\text{-}6)$$

Otherwise (cbr_flag[SchedSelIdx] is equal to 1), the following condition shall be true:

$$\text{Floor}(\text{deltaTime90}k[n]) \leq \text{InitCpbRemovalDelay}[\text{SchedSelIdx}] \leq \text{Ceil}(\text{deltaTime90}k[n]) \quad (F\text{-}7)$$

NOTE 1—The exact number of bits in the CPB at the removal time of each picture may depend on which buffering period SEI message is selected to initialize the HRD. Encoders must take this into account to ensure that all specified constraints must be obeyed regardless of which buffering period SEI message is selected to initialize the HRD, as the HRD may be initialized at any one of the buffering period SEI messages.

2. A CPB overflow is specified as the condition in which the total number of bits in the CPB is greater than the CPB size. The CPB shall never overflow.
3. A CPB underflow is specified as the condition in which the nominal CPB removal time of decoding unit m DuNominalRemovalTime(m) is less than the final CPB arrival time of decoding unit m DuFinalArrivalTime (m) for at least one value of m. When low_delay_hrd_flag[HighestTid] is equal to 0, the CPB shall never underflow.
4. When SubPicHrdFlag is equal to 1, low_delay_hrd_flag[HighestTid] is equal to 1, and the nominal removal time of a decoding unit m of access unit n is less than the final CPB arrival time of decoding unit m (i.e. DuNominalRemovalTime[m]<DuFinalArrivalTime [m]), the nominal removal time of access unit n shall be less than the final CPB arrival time of access unit n (i.e. AuNominalRemovalTime[n]<AuFinalArrivalTime [n]).
5. The nominal removal times of access units from the CPB (starting from the second access unit in decoding order) shall satisfy the constraints on AuNominalRemovalTime[n] and AuCpbRemovalTime[n] expressed in subclauses A.4.1 through A.4.2.
6. For each current picture, after invocation of the process for removal of pictures from the DPB as specified in subclause C.3.2, the number of decoded pictures in the associated sub-DPB, including all pictures n that are marked as "used for reference", or that have PicOutputFlag equal to 1 and AuCpbRemovalTime[n] less than AuCpbRemovalTime[currPic], where currPic is the current picture, shall be less than or equal to sps_max_dec_pic_buffering_minus1[HighestTid] when the vps_max_layers_minus1 equal to 0, and less than or equal to AssociatedSubDpbSize[currLayerId] [HighestTid] when vps_max_layers_minus1 is greater than 0 . . . .

F.13.5.2.2 Output and Removal of Pictures from the DPB

The output and removal of pictures from the DPB before the decoding of the current picture (but after parsing the slice header of the first slice of the current picture) happens instantaneously when the first decoding unit of the current picture is removed from the CPB and proceeds as follows:
The decoding process for RPS as specified in subclause 8.3.2 is invoked.
If the current picture is an IRAP picture with NoRaslOutputFlag equal to 1 and with nuh_layer_id equal to 0 that is not picture 0, the following ordered steps are applied:
1. The variable NoOutputOfPriorPicsFlag is derived for the decoder under test as follows:
If the current picture is a CRA picture, NoOutputOfPriorPicsFlag is set equal to 1 (regardless of the value of no_output_of_prior_pics_flag).
Otherwise, if the value of pic_width_in_luma_samples, pic_height_in_luma_samples, or sps_max_dec_pic_buffering_minus1[HighestTid] derived from the active SPS is different from the value of pic_width_in_luma_samples, pic_height_in_luma_samples, or sps_max_dec_pic_buffering_minus1[HighestTid], respectively, derived from the SPS active for the preceding picture in the decoding order with the same nuh_layer_id value as the current picture, NoOutputOfPriorPicsFlag may (but should not) be set to 1 by the decoder under test, regardless of the value of no_output_of_prior_pics_flag.
NOTE 6—Although setting NoOutputOfPriorPicsFlag equal to no_output_of_prior_pics_flag is preferred under these conditions, the decoder under test is allowed to set NoOutputOfPriorPicsFlag to 1 in this case.
Otherwise, NoOutputOfPriorPicsFlag is set equal to no_output_of_prior_pics_flag.
2. The value of NoOutputOfPriorPicsFlag derived for the decoder under test is applied for the HRD as follows:
If NoOutputOfPriorPicsFlag is equal to 1, all picture storage buffers in all the sub-DPBs in the DPB are emptied without output of the pictures they contain, and the sub-DPB fullness is set equal to 0 for all the sub-DPBs.
Otherwise (NoOutputOfPriorPicsFlag is equal to 0), all picture storage buffers containing a picture that is marked as "not needed for output" and "unused for reference" are emptied (without output), and all non-empty picture storage buffers in the DPB are emptied by repeatedly invoking the "bumping" process specified in subclause F.13.5.2.4, and the DPB fullness is set equal to 0.
Otherwise (the current picture is not an IRAP picture with NoRaslOutputFlag equal to 1 or with nuh_layer_id not equal to 0), all picture storage buffers containing a picture which are marked as "not needed for output" and "unused for reference" are emptied (without output). For each picture storage buffer that is emptied, the sub-DPB fullness of the sub-DPB associated with that picture storage buffer is decremented by one. The variable currLayerId is set equal to nuh_layer_id of the current decoded picture and when one or more of the following conditions are true, the "bumping" process specified in subclause F.13.5.2.4 is invoked repeatedly while further decrementing the DPB fullness by one for each additional picture storage buffer that is emptied, until none of the following conditions are true:
The number of pictures with nuh_layer_id equal to currLayerId in the sub-DPB that is associated with current picture that are marked as "needed for output" is greater than sps_max_num_reorder_pics[HighestTid] from the active SPS (when currLayerId is equal to 0) or from the active layer SPS for the value of currLayerId (when currLayerId is not equal to 0).
sps_max_latency_increase_plus1[HighestTid] of the active SPS (when currLayerId is equal to 0) or the active layer SPS for the value of currLayerId is not equal to 0 and there is at least one picture with nuh_layer_id equal to currLayerId in the DPB that is marked as "needed for output" for which the associated variable PicLatencyCount[currLayerId] is greater than or equal to SpsMaxLatencyPictures[HighestTid] derived from the active SPS (when currLayerId is equal to 0) or from the active layer SPS for the value of currLayerId.
The number of pictures with nuh_layer_id equal to currLayerId in the associated sub-DPB is greater than or equal to sps_max_dec_pic_buffering_minus1[HighestTid]+1 from the active SPS (when vps_max_layers_minus1 is equal to 0) or greater than or equal to AssociatedSubDpbSize[currLayerId][HighestTid] (when vps_max_layers_minus1 is greater than 0).

F.13.5.2.2 Picture Decoding, Marking, Additional Bumping, and Storage

The processes specified in this subclause happen instantaneously when the last decoding unit of access unit n containing the current picture is removed from the CPB.
The variable currLayerId is set equal to nuh_layer_id of the current decoded picture.
For each picture in the associated sub-DPB that is marked as "needed for output" and that has a nuh_layer_id value equal to currLayerId, the associated variable PicLatencyCount[currLayerId] is set equal to PicLatencyCount[currLayerId]+1.

The current picture is considered as decoded after the last decoding unit of the picture is decoded. The current decoded picture is stored in an empty picture storage buffer in the DPB, and the following applies:

If the current decoded picture has PicOutputFlag equal to 1, it is marked as "needed for output" and its associated variable PicLatencyCount[currLayerId] is set equal to 0.

Otherwise (the current decoded picture has PicOutputFlag equal to 0), it is marked as "not needed for output".

The current decoded picture is marked as "used for short-term reference".

When one or more of the following conditions are true, the "bumping" process specified in subclause F.13.5.2.4 is invoked repeatedly until none of the following conditions are true:

The number of pictures with nuh_layer_id equal to currLayerId in the associated sub-DPB that are marked as "needed for output" is greater than sps_max_num_reorder_pics[HighestTid] from the active SPS (when currLayerId is equal to 0) or from the active layer SPS for the value of currLayerId, if not equal to 0.

sps_max_latency_increase_plus1[HighestTid] is not equal to 0 and there is at least one picture with nuh_layer_id equal to currLayerId in the associated sub-DPB that is marked as "needed for output" for which the associated variable PicLatencyCount[currLayerId] that is greater than or equal to SpsMaxLatencyPictures[HighestTid] derived from the active SPS (when currLayerId is equal to 0) or from the active layer SPS for the value of currLayerId (when currLayerId is not equal to 0).

The following section shows another example implementations of the techniques of this disclosure in terms of additions and deletions from the HEVC specification (e.g., HEVC version 1, SHEVC, and/or MV-HEVC). Again, additions to the HEVC specification are shown in underline, while deletions from the HEVC specification are shown with a strikethrough. The following example implementation is similar to the implementation shown above; however the syntax element indicating the maximum size of a sub-DPB (VpsSubDpbMaxDecPicBuf) is signaled differently. In particular, the following example implementation shown in Table 5 uses an additional syntax element (overlap_sub_dpb_sizes_flag) that indicates that a number of sub-DPB sizes are the same for some number of operation points.

TABLE 5

Second Example DPB Size Table Syntax

```
max_dpb_sizes_table( ) {
    for( i = 0; i < vps_number_layer_sets_minus1; i++ )
        for( k = vps_max_sub_layers_minus1; k>0 &&
opPresFlag; k-- ) {
            op_info_supported_flag[ i ][ k ]                u(1)
            opPresFlag = op_info_supported_flag[ i ][ k ]
            ...
        }
    for( i = 0; i < numOutputLayerSets; i++ )
        for( k=0; k <= vps_max_sub_layers_minus1; k++ )
            if (opInfoSupportedFlag[ i ][ k ] ) {          u(1)
                overlap_sub_dpb_sizes_flag[ j ]
                for( j=0; j <
                    ( overlap_sub_dpb_sizes_flag[ j ] ?
(NumSubDpbs[ i ][ k ] – NumSubDpbs[ i ][ k-1 ]):
```

TABLE 5-continued

Second Example DPB Size Table Syntax

```
NumSubDPBs[ i ][ k ];j++) {
    vps_sub_dpb_max_dec_pic_buffering_values[ i ][ k ][ j ]    u(v)
    }
}
```

F.1.1.1.1.1 Max dpb Sizes Table Semantics
. . .
overlap_sub_dpb_sizes_flag[j] equal to 1 specifies the first several entries of the vpsSubDpbMaxDPB[i][k][j] are the same as all entries of the vpsSubDpbMaxDPB[i−1][k][j] therefore only additional entries of vpsSubDpbMaxDPB[i][k][j] are present. overlap_sub_dpb_sizes_flag[j] equal to 1 specifies all entries of vpsSubDpbMaxDPB[i][k][j] are present.

vps_sub_dpb_max_dec_pic_buffering_values[i][k][j] specifies the values of vpsSubDpbMaxDPB[i][k][j]. It is in the range of 0 to vpsSubDpbMaxDPB[i][k][j] is derived as follows:
signaledSize[i][k][j]=vps_sub_dpb_max_dec_pic_buffering_values[i][k][j]).
derivedSize[i][k][j]=(j<NumSubDPBs[i−1][k])? vpsSubDpbMaxDPB[i−1][k][j]:signaledSize[i][k][j+NumSubDPBs[i−1][k]].
vpsSubDpbMaxDPB[i][k][j] (overlap_sub_dpb_sizes_flag[j] ? derivedSize[i][k][j]:signaledSize[i][k][j].

The following section shows another example implementation for signaling sub-DPBs sizes in HEVC. In this example, sub-DPB sizes without regard to a particular layer (e.g., as indicated by a TemporalID).

TABLE 6

Third Example DPB Size Table Syntax

```
max_dpb_sizes_table( ) {
    num_sub_dpb_capacities_minus1                              ue(v)
    for( i = 0; i <= num_sub_dpb_capacities_minus1;
i++) {
        num_sub_dpb_size_minus1[ i ]                            ue(v)
        for( j = 0; j <= num_sub_dpb_size_minus1[ i ];
j++)
            delta_sub_dpb_size_minus1[ i ][ j ]                 ue(v)
    }
    for( i = 1; i <= vps_number_layer_sets_minus1; i++ )
        for( k =0; k <= vps_max_sub_layers_minus1; k++ )
            if( num_sub_dpb_capacities_minus1 > 0) {
                same_num_sub_dpbs_flag[ i ][ k ]                u(1)
                if( !same_num_sub_dpbs_flag[ i ][ k ] )
                    delta_num_sub_dpbs_minus1[ i ][ k ]         ue(v)
            }
    for( i = 1; i < NumOutputLayerSets; i++ )
        for( k = vps_max_sub_layers_minus1; k >= 0;
k++ )
            for( j = 0; j <
NumSubDPBs[ output_layer_set_idx_minus1 [ i ] + 1 ][ k ];
j++) {
                if( num_sub_dpb_capacities_minus1 > 0 )
                    sub_dpb_capacity_idx[ i ][ k ][ j ]        u(v)
                    sub_dpb_size_idx[ i ][ k ][ j ]            u(v)
            }
}
```

In another example, it is not required that the numbers of layers are not decreasing when signaling the layer sets. Therefore, the syntax elements num_sub_dpbs_minus1[i][j], instead of the syntax elements delta_num_sub_dpbs_minus1[i][j] are signaled, indicating the number of sub-DPBs directly for each layer set. In another example, the number of layer is not signaled by video encoder 20, but instead, are derived at video decoder 30.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    partitioning a decoded picture buffer (DPB) into a plurality of sub-DPBs;
    receiving, in a video parameter set, at least one indication of a sub-DPB size for the plurality of sub-DPBs for a plurality of operation points of a multi-layer video coding process, wherein respective operation points define a highest temporal ID and a set of target output layers of the multi-layer video coding process that are decoded for a particular picture to be output;
    allocating memory space for the plurality of sub-DPBs based on the at least one indication;
    decoding pictures for a plurality of layers; and
    storing the pictures for the plurality of layers in the plurality of sub-DPBs.

2. The method of claim 1, wherein each of the plurality of sub-DPBs is configured to store pictures for one of a plurality of different layer types in the multi-layer video coding process, and wherein storing the pictures for the plurality of layers in the plurality of sub-DPBs comprises storing pictures for each of the plurality of layers in a particular one of the sub-DPBs according to a layer type of the respective picture.

3. The method of claim 2, further comprising:
    outputting the pictures stored in the plurality of sub-DPBs according to an output time, wherein pictures in sub-DPBs having the same output time are output at the same time;
    performing a marking process on the pictures in each of the plurality of sub-DPBs independently, wherein the marking process marks pictures as used for reference or marks the pictures as unused for reference; and
    removing pictures from the plurality of sub-DPBs that are no longer needed for output and have been marked as unused for reference.

4. The method of claim 2, further comprising:
    determining the layer type by at least one of a spatial resolution, bit depth, or color format.

5. The method of claim 2, wherein the multi-layer video coding process is one of a multi-view video coding process or a scalable video coding process.

6. The method of claim 1, wherein the at least one indication is a syntax element having a value that explicitly indicates the sub-DPB size, and wherein the sub-DPB size is a number of pictures.

7. The method of claim 1, wherein the at least one indication is a syntax element having a value that represents a difference between the sub-DPB size for the plurality of operation points and a sub-DPB size for a previously signaled operation point.

8. The method of claim 1, wherein receiving the at least one indication of the sub-DPB size comprises receiving a respective indication of sub-DPB size for each of the plurality of sub-DPBs for the plurality of operation points of the multi-layer video coding process.

9. The method of claim 1, further comprising:
    receiving an indication of a number of the sub-DPBs; and
    partitioning the DPB into a plurality of sub-DPBs based on the indication of the number of sub-DPBs.

10. The method of claim 9, further comprising:
deriving an index identifying each of the plurality of sub-DPBs according to a layer type.

11. An apparatus configured to decode video data, the apparatus comprising:
a decoded picture buffer (DPB) configured to store video data; and
a video decoder configured to:
partition the DPB into a plurality of sub-DPBs;
receive, in a video parameter set, at least one indication of a sub-DPB size for the plurality of sub-DPBs for a plurality of operation points of a multi-layer video coding process, wherein respective operation points define a highest temporal ID and a set of target output layers of the multi-layer video coding process that are decoded for a particular picture to be output;
allocate memory space for the plurality of sub-DPBs based on the at least one indication;
decode pictures for a plurality of layers; and
store the pictures for the plurality of layers in the plurality of sub-DPBs.

12. The apparatus of claim 11, wherein each of the plurality of sub-DPBs is configured to store pictures for one of a plurality of different layer types in the multi-layer video coding process, and wherein the video decoder is further configured to store pictures for each the plurality of layers in a particular one of the sub-DPBs according to a layer type of the respective picture.

13. The apparatus of claim 12, wherein the video decoder is further configured to:
output the pictures stored in the plurality of sub-DPBs according to an output time, wherein pictures in sub-DPBs having the same output time are output at the same time;
perform a marking process on the pictures in each of the plurality of sub-DPBs independently, wherein the marking process marks pictures as used for reference or marks the pictures as unused for reference; and
remove pictures from the plurality of sub-DPBs that are no longer needed for output and have been marked as unused for reference.

14. The apparatus of claim 12, wherein the video decoder is further configured to:
determine the layer type by at least one of a spatial resolution, bit depth, or color format.

15. The apparatus of claim 12, wherein the multi-layer video coding process is one of a multi-view video coding process or a scalable video coding process.

16. The apparatus of claim 11, wherein the at least one indication is a syntax element having a value that explicitly indicates the sub-DPB size, and wherein the sub-DPB size is a number of pictures.

17. The apparatus of claim 11, wherein the at least one indication is a syntax element having a value that represents a difference between a sub-DPB size for the plurality of operation points and a sub-DPB size for a previously signaled operation point.

18. The apparatus of claim 11, wherein the video decoder is further configured to receive a respective indication of the sub-DPB size for each of the plurality of sub-DPBs for the plurality of operation points of the multi-layer video coding process.

19. The apparatus of claim 18, wherein the video decoder is further configured to:
receive an indication of a number of sub-DPBs; and
partition the DPB into a plurality of sub-DPBs based on the indication of the number of sub-DPBs.

20. The apparatus of claim 19, wherein the video decoder is further configured to:
derive an index identifying each of the plurality of sub-DPBs according to a layer type.

21. An apparatus configured to decode video data, the apparatus comprising:
means for partitioning a decoded picture buffer (DPB) into a plurality of sub-DPBs;
means for receiving, in a video parameter set, at least one indication of a sub-DPB size for the plurality of sub-DPBs for a plurality of operation points of a multi-layer video coding process, wherein respective operation points define a highest temporal ID and a set of target output layers of the multi-layer video coding process that are decoded for a particular picture to be output;
means for allocating memory space for the plurality of sub-DPBs based on the at least one indication;
means for decoding pictures for a plurality of layers; and
means for storing the pictures for the plurality of layers in the plurality of sub-DPBs.

22. A non-transitory computer-readable storage medium storing instructions that, when executed, cause one or more processors of a device configured to decode video data to:
partition a decoded picture buffer (DPB) into a plurality of sub-DPBs;
receive, in a video parameter set, at least one indication of a sub-DPB size for the plurality of sub-DPBs for a plurality of operation points of a multi-layer video coding process, wherein respective operation points define a highest temporal ID and a set of target output layers of the multi-layer video coding process that are decoded for a particular picture to be output;
allocate memory space for the plurality of sub-DPBs based on the at least one indication;
decode pictures for a plurality of layers; and
store the pictures for the plurality of layers in the plurality of sub-DPBs.

23. A method of encoding video data, the method comprising:
encoding a plurality of pictures of a plurality of different layer types;
reconstructing the plurality of pictures of the plurality of different layer types;
storing the plurality of pictures in a decoded picture buffer (DPB), wherein the DPB is partitioned into a plurality of sub-DPBs; and
generating, in a video parameter set, at least one indication of a sub-DPB for the plurality of sub-DPBs for a plurality of operation points of a multi-layer video coding process, wherein respective operation points define a highest temporal ID and a set of target output layers of the multi-layer video coding process that are decoded for a particular picture to be output.

24. The method of claim 23, wherein each of the plurality of sub-DPBs is configured to store pictures for one of a plurality of different layer types in the multi-layer video coding process, and wherein storing the pictures for the plurality of layers in the plurality of sub-DPBs comprises storing pictures for each of the plurality of layers in a particular one of the sub-DPBs according to a layer type of the respective picture.

25. The method of claim 24, wherein the multi-layer video coding process is one of a multi-view video coding process or a scalable video coding process.

26. The method of claim 23, wherein the at least one indication is a syntax element having a value that explicitly indicates the sub-DPB size, and wherein the sub-DPB size is a number of pictures.

27. The method of claim 23, wherein the at least one indication is a syntax element having a value that represents a difference between a sub-DPB size for the plurality of operation points and a sub-DPB size for a previously signaled operation point.

28. The method of claim 23, wherein generating the at least one indication of the sub-DPB size comprises generating a respective indication of the sub-DPB size for each of the plurality of sub-DPBs for the plurality of operation points of the multi-layer video coding process.

29. An apparatus configured to encode video data, the apparatus comprising:
a decoded picture buffer (DBP) configured to store video data; and
a video encoder configured to:
encode a plurality of pictures of a plurality of different layer types;
reconstruct the plurality of pictures of the plurality of different layer types;
store the plurality of pictures in the DPB, wherein the DPB is partitioned into a plurality of sub-DPBs; and
generate, in a video parameter set, at least one indication of a sub-DPB size for the plurality of sub-DPBs for a plurality of operation points of a multi-layer video coding process, wherein respective operation points define a highest temporal ID and a set of target output layers of the multi-layer video coding process that are decoded for a particular picture to be output.

30. The apparatus of claim 29, wherein each of the plurality of sub-DPBs is configured to store pictures for one of a plurality of different layer types in the multi-layer video coding process, and wherein storing the pictures for the plurality of layers in the plurality of sub-DPBs comprises storing pictures for each of the plurality of layers in a particular one of the sub-DPBs according to a layer type of the respective picture.

31. The apparatus of claim 30, wherein the multi-layer video coding process is one of a multi-view video coding process or a scalable video coding process.

32. The apparatus of claim 29, wherein the at least one indication is a syntax element having a value that explicitly indicates the sub-DPB size, and wherein the sub-DPB size is a number of pictures.

33. The apparatus of claim 29, wherein the at least one indication is a syntax element having a value that represents a difference between a sub-DPB size for the plurality of operation points and a sub-DPB size for a previously signaled operation point.

34. The apparatus of claim 29, wherein the video encoder is further configured to generate a respective indication of the sub-DPB size for each of the plurality of sub-DPBs for the plurality of operation points of a multi-layer video coding process.

35. An apparatus configured to encode video data, the apparatus comprising:
means for encoding a plurality of pictures of a plurality of different layer types;
means for reconstructing the plurality of pictures of the plurality of different layer types;
means for storing the plurality of pictures in a decoded picture buffer (DPB), wherein the DPB is partitioned into a plurality of sub-DPBs; and
means for generating, in a video parameter set, at least one indication of a sub-DPB size for the plurality of sub-DPBs for a plurality of operation points of a multi-layer video coding process, wherein respective operation points define a highest temporal ID and a set of target output layers of the multi-layer video coding process that are decoded for a particular picture to be output.

36. A non-transitory computer-readable medium storing instructions that, when executed, cause one or more processors of a device configured to encode video data to:
encode a plurality of pictures of a plurality of different layer types;
reconstruct the plurality of pictures of the plurality of different layer types;
store the plurality of layer pictures in the DPB, wherein the DPB is partitioned into a plurality of sub-DPBs; and
generate, in a video parameter set, at least one indication of a sub-DPB size for the plurality of sub-DPBs for a plurality of operation points of a multi-layer video coding process, wherein respective operation points define a highest temporal ID and a set of target output layers of the multi-layer video coding process that are decoded for a particular picture to be output.

* * * * *